(12) United States Patent
Geva et al.

(10) Patent No.: US 10,146,419 B2
(45) Date of Patent: Dec. 4, 2018

(54) METHOD AND SYSTEM FOR SECTION-BASED EDITING OF A WEBSITE PAGE

(71) Applicant: Wix.com Ltd., Tel Aviv (IL)

(72) Inventors: Ayelet Geva, Tel Aviv (IL); Yael Hasson, Ohr Yehuda (IL); Avishai Abrahami, Tel Aviv (IL); Yaniv Ben Simon, Ramat Gan (IL); Yotam Barzilay, Tel Aviv (IL); Nadav Abrahami, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

(21) Appl. No.: 15/292,172

(22) Filed: Oct. 13, 2016

(65) Prior Publication Data

US 2017/0046317 A1  Feb. 16, 2017

Related U.S. Application Data

(63) Continuation-in-part of application No. 13/779,798, filed on Feb. 28, 2013, which is a continuation-in-part of application No. 13/771,119, filed on Feb. 20, 2013, application No. 15/292,172, filed on Oct. 13, 2016, which is a continuation-in-part of application No. 14/483,981, filed on Sep. 11, 2014.

(Continued)

(51) Int. Cl.
| | | |
|---|---|---|
| G06F 3/0484 | (2013.01) | |
| G06F 17/21 | (2006.01) | |
| G06F 17/22 | (2006.01) | |
| G06F 17/24 | (2006.01) | |
| G06F 3/0485 | (2013.01) | |

(52) U.S. Cl.
CPC ........ G06F 3/04847 (2013.01); G06F 17/211 (2013.01); G06F 17/24 (2013.01); *G06F 3/04855* (2013.01); *G06F 2203/04806* (2013.01)

(58) Field of Classification Search
CPC ........... G06F 17/3089; G06F 17/30867; G06F 17/211; G06F 17/212; G06F 17/24
See application file for complete search history.

(56) References Cited

U.S. PATENT DOCUMENTS

| | | | | |
|---|---|---|---|---|
| 8,489,984 B1 * | 7/2013 | Violet | ....................... | G06F 8/34 715/209 |
| 9,043,698 B2 * | 5/2015 | Tucovic | ................ | G06F 17/212 715/246 |

(Continued)

*Primary Examiner* — Ariel Mercado
(74) *Attorney, Agent, or Firm* — Heidi Brun Associates LTD.

(57) ABSTRACT

A visual design system implementable on a computing device, the device having a processor and a memory. The system includes a dynamic layout editor to edit a visual creation with absolute positioning including at least one page having a least two components during an editing session; a page analyzer to perform at least geometrical analysis on the at least two components and to divide the page into at least one section according to the analysis; a UI subsystem to generate and present each at least one section as a virtual container and to generate at least one section manipulator tool to enable a user to perform manipulation on the at least one section; and a change executor to regenerate the page based on the manipulation to the at least one section and at least according to dynamic layout rules.

26 Claims, 35 Drawing Sheets

Related U.S. Application Data

(60) Provisional application No. 61/605,243, filed on Mar. 1, 2012, provisional application No. 61/600,726, filed on Feb. 20, 2012, provisional application No. 61/876,795, filed on Sep. 12, 2013, provisional application No. 62/241,193, filed on Oct. 14, 2015.

(56) References Cited

U.S. PATENT DOCUMENTS

| | | | |
|---|---|---|---|
| 2004/0194028 A1* | 9/2004 | O'Brien | G06F 17/211 715/247 |
| 2005/0177401 A1* | 8/2005 | Koeppel | G06Q 30/02 705/4 |
| 2007/0240039 A1* | 10/2007 | Hosotsubo | G06F 17/211 715/210 |
| 2009/0249239 A1* | 10/2009 | Eilers | G06F 17/24 715/769 |
| 2014/0129924 A1 | 5/2014 | Le Bescond De Coatpont | |
| 2014/0208203 A1* | 7/2014 | Tang | G06F 17/212 715/252 |

* cited by examiner

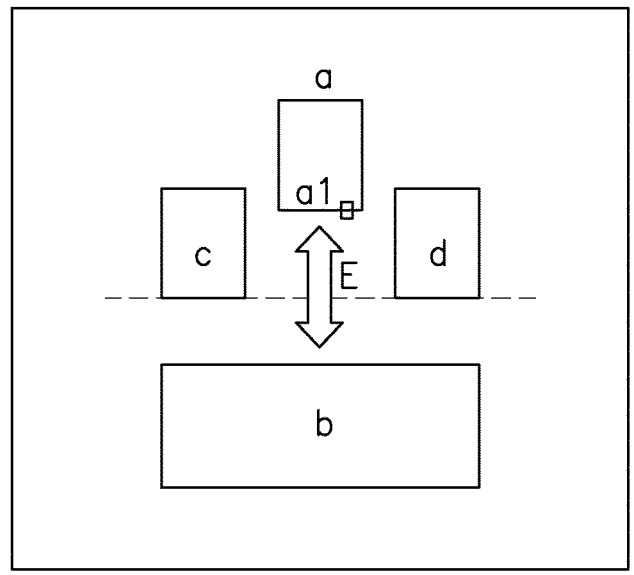
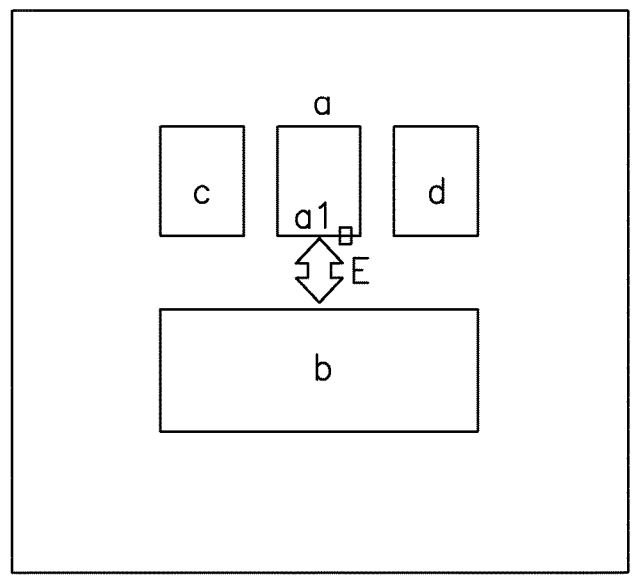
FIG.3

Definitions:

BLOCK_COMPONENT_WIDTH = 700px
CLUSTER_GAP = 30px
MINIMUM_SECTION_HEIGHT = 30px
MAXIMUM_SECTIONS_MERGE_DISTANCE = 30px function getPageSections(page) {

1. sections = new Array();
2. sortedComponents = page.components sorted by y position (ascending);
3. blockComponents = components in sortedComponents with width >= BLOCK_COMPONENT_WIDTH;
4. regularComponents =components in sortedComponents with width < BLOCK_COMPONENT_WIDTH;
5. For each blockComponent in blockComponents:
   a. Create a section that contains:
      i. The blockComponent itself;
      ii. All block components that are vertically contained within blockComponent;
      iii. All regular components that are vertically contained by at least 50% of their height (i.e. 50% of their height is contained in blockComponent?s vertical range);
   b. Set the section's top and bottom position to be the block component's top and bottom position (note that regular components may thus protrude slightly from the section boundaries – which are set according to the larger blockComponent);
   c. Push the new section into the sections list;
   d. Remove the components that are contained in the current section from the component arrays (blockComponents and regularComponents);

FIG. 17A 6. clusters = divide the remaining regularComponents into clusters with a vertical space between them of at least CLUSTER_GAP:
   a. if compA.bottomY + CLUSTER_GAP < compB.y then compA and compB are in the same cluster;
   b. if compB.bottomY + CLUSTER_GAP >= compB.y then compA and compB are in different clusters;
7. For each cluster in clusters:
   a. create a section that contains all the components in the cluster
   b. set the section's position:
      i. section.position.top = the top-y position of the top-most component in the section;
      ii. section.position.bottom = the bottom-y position of the bottom-most component in the section;
   c. push the new section into the sections list;
8. if any section is shorter than the MINIMUM_SECTION_HEIGHT, and the closest section to it is less than MAXIMUM_SECTIONS_MERGE_DISTANCE away
   a. merge the two sections:
      i. Merge the short section's components into the larger section's components
      ii. Set the large section's top position to the minimum minimum between its top and the short section's top
      iii. Set the large section's bottom position to the maximum between its bottom and the short section's bottom
9. Return sections;

FIG. 17B

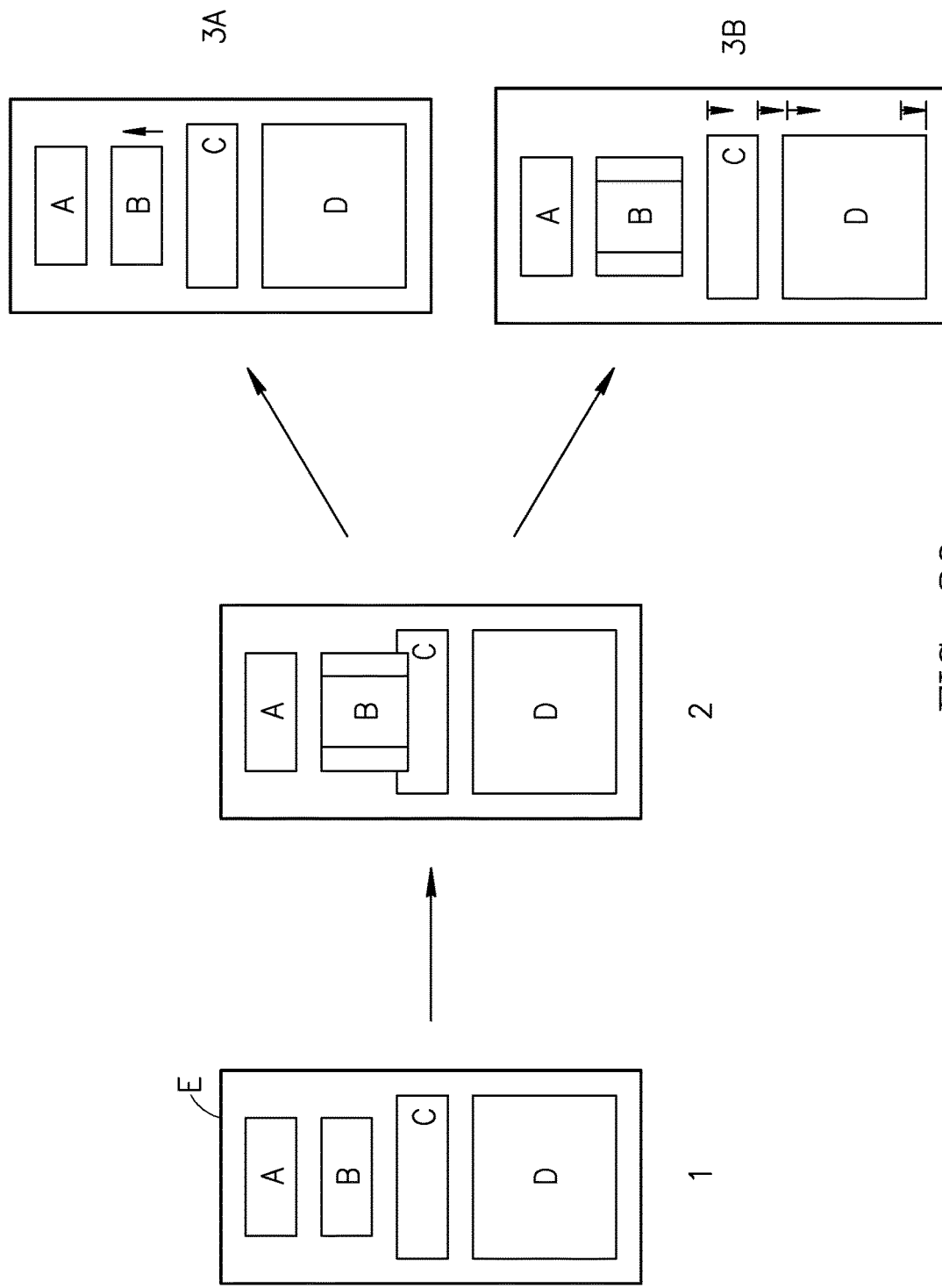

FIG. 31

METHOD AND SYSTEM FOR SECTION-BASED EDITING OF A WEBSITE PAGE

CROSS-REFERENCE TO RELATED APPLICATIONS

This application is Continuation-In-Part application of the following applications:

U.S. patent application Ser. No. 13/779,798 filed Feb. 28, 2013 which claims priority from U.S. Provisional Patent Application 61/605,243, filed Mar. 1, 2012;

U.S. patent application Ser. No. 13/771,119 filed 20 Feb. 2013, which claims priority from U.S. Provisional Patent Application No. 61/600,726 filed 20 Feb. 2012; and U.S. patent application Ser. No. 14/483,981 filed Sep. 11, 2014, which claims priority from U.S. Provisional Patent Application No. 61/876,795 filed Sep. 12, 2013, all of which are incorporated herein by reference.

The application also claims priority from U.S. Provisional Patent Application 62/241,193, filed Oct. 14, 2015 which is also incorporated herein by reference.

FIELD OF THE INVENTION

The present invention relates to dynamic layout and its use in section-based editing of visual creations such as web sites through adjustment handles and other mechanisms.

BACKGROUND OF THE INVENTION

Current visual design systems use a WYSIWYG (What You See Is What You Get) metaphor to provide a convenient, high-productivity and easy to use environment for the creation and editing of graphical applications and creations. Such creations or applications can include web sites, catalogs, presentations, e-shops, flow diagrams as well as other application categories. These creations are deployed to systems which display them on a display screen, or to systems which print them. Such visual design systems allow the designers (and sometimes the users) to resize and move components located in application pages.

A visual design system may integrate both static and dynamic content into the applications created in it. Static content may be stored locally and dynamic content may originate from a number of sources such as from the application itself, a database, external dynamic data sources (or streams) such as a RSS feed or content generated by other users of the same system.

Visual design systems may be standalone systems (such as the MICROSOFT VISIO diagram editor or the MICROSOFT POWERPOINT presentation program), or may be embedded inside a larger editing system (such as the MICROSOFT WORD AUTOSHAPE editor).

A designer using such a system may design a new application from scratch (starting with a blank screen), or may rely on predefined templates created by the application designer, by the system creator, or by the designer community. When a template is provided, the designer can customize it at will, adding, removing or modifying all elements of the template to create his or her version of the template.

Such applications generally consist of multiple pages. An application can include any number of pages and pages can typically be added or removed by the system designer and/or the end-user as required. Pages contain components which can be further classified as either atomic (those that cannot be broken down into sub-components) or container (which occupy a given screen area and can contain one or more further sub-components). Components may be fixed in shape and content, may be based on a content management system or may be based on user specified content such as a text area into which the designer enters text. Dynamic components can be based on external information (static or dynamic), such as a RSS feed displaying information from an external data source or the content of a given internet page.

Container components can be nested to a number of levels and can contain components of multiple types. Some containers are also limited to contain specific classes of contained components such as a photo album container which may only hold picture components. Component appearances and screen areas can be modified by moving, resizing, rotation and similar operations. Their appearance and behavior can also be modified by various modifiers, such as blurring and animation (e.g. the component has blurred edges, or appears on the screen by expanding from a single pixel, etc.) During the application creation and editing process, the content of a component may be entered and modified in a number of ways.

In visual design systems, typically the pages (containing the components) as well as the components themselves (container and atomic components) are rectangles whose sides are parallel to each other and to the sides of the display screen. They are also parallel to the X and Y axes of the system on which the pages are being displayed or printed. In some cases, the components themselves are not axes-parallel rectangles. They may be a rotated rectangle, a combination of attached rectangles, or have a different shape altogether. In these cases, visual design systems (and their layout management element) typically handle the components using a per-component minimal enclosing axes-parallel rectangle which contains the irregularly-shaped component.

Components do not have to occupy mutually exclusive screen regions, and may in fact geometrically intersect each other. A component may also be situated completely within the boundaries of another component. The screen area overlap may be coupled with logical containment (i.e. the component "belongs" to a given container—and moves with the container wherever it goes), or be a mere geometrical overlap which is not based on any containment relationship. Whenever components intersect, a display priority attached to each component controls which component is displayed on top of which component. A visual design system typically employs a layout manager which manages component places, sizes, display order and related issues.

Visual design systems can often be classified as absolute position or relative position systems (described in more detail herein below). In absolute positioning systems, the focus is on exact component positioning. The location of the components is defined as an absolute position value (x,y) relative to the containing entity, be it relative to the page itself or to a container containing the component. The position is typically expressed as an offset between the top left corner of the containing entity and the top left corner of the component.

In relative positioning systems, the focus is on the concept of flow or natural order. The system arranges components along a logical content flow, which typically corresponds to the reading order of the components whenever such an order is applicable. For example, an English language word processor is essentially a layout system for characters (and words) which uses the natural reading order of the English language (top to bottom and then left to right) to arrange the displayed characters and words. Another example is a blog editing system (such as the WORDPRESS blogging platform commercially available from wordpress.org), which arranges page elements (blog entries, talkbacks etc.) on a page according to a natural reading flow.

Thus, in a relative positioning system, the components are positioned relative to each other, so a component is displayed after (position-wise) the display of a previous component ends. Existing absolute and relative positioning systems both define a default screen or page size, which is used for all displayed pages. All relative positioning systems (and some absolute positioning systems) will increase this size as required to accommodate the addition of content to the page.

Visual design systems which use absolute positioning are best suited for exact layout and design of the displayed page. Such exact placement allows components to be properly sized, positioned and aligned on the displayed screen. For example, as illustrated in FIG. 1 components [a], [b], [c] and [d] are arranged on a page P. Components [e] and [f] are then added in the available space (page Q), so that all are properly aligned —[a], [e] and [c] in the first row, and [b], [f] and [d] in the second row —without the need to push components aside or to calculate the correct reading flow.

There are also two main types of absolute positioning systems, constraint based systems and anchor-based systems. The types are not mutually exclusive and systems can contain elements of both systems. In visual design systems, constraints and anchors can be specified explicitly by the designer (through the system user interface) or inferred automatically by the system based on existing component layout and information. In a constraint-based system, the designer defines dynamic mathematical constraints on the relationships between the components residing on the screen. In anchor-based systems, the dynamic layout is defined in terms of anchors set between components and framework elements, as well as between the components themselves.

Dynamic layout, the automatic adjustment of components according to their content to fit on a page, is known in the art. In existing systems, dynamic layout is typically present in relative (rather than absolute) positioning systems. Current methods available provide both manual and automatic solutions using standard methodologies such as anchoring. Dynamic layout involves the moving and resizing of components on the screen based on dynamic layout triggers. These triggers may include content changes, multiple target platforms (display of the application using different technologies on different viewing platforms), multiple screen sizes (display of the application using a number of displays which have different sizes and resolutions), dynamic data (use of components containing dynamic data which changes over time), end user changes and application initiated layout changes.

Reference is now made to Fig. 2 which illustrates the implementation of dynamic layout on components [a] and [b] situated on a page W. As can be seen, component [a] is placed slightly above component [b] with a small separation between them. During editing, when component [a] is moved down, it begins to overlap and occlude component [b] as seen on page X. In such a scenario, it would be desirable to also move component [b] downwards accordingly in order to view the content of component [b] as is shown on page Y or to even resize it accordingly (i.e. shrink it), as shown on page Z, without losing sight of the content of component [b]. Such changes include not only modifications to the content of the displayed components ([a], [b]) but also modifications to their style and other display parameters, such as text size and font.

U.S. Patent Publication 2013/0219263 published Aug. 22, 2013, assigned to the common assignee of the present invention, describes dynamic layout and dynamic layout rules in more detail and is incorporated herein by reference.

SUMMARY OF THE PRESENT INVENTION

There is provided in accordance with a preferred embodiment of the present invention, a visual design system implementable on a computing device, the device including a processor and a memory. The system includes a dynamic layout editor to edit a visual creation with absolute positioning including at least one page having a least two components during an editing session; a page analyzer to perform at least geometrical analysis on the at least two components and to divide the at least one page into at least one section according to the analysis; a UI subsystem to generate and present each at least one section as a virtual container and to generate at least one section manipulator tool to enable a user to perform manipulation on the at least one section; and a change executor to regenerate the at least one page based on the manipulation to the at least one section and at least according to dynamic layout rules.

Moreover, in accordance with a preferred embodiment of the present invention, the page analyzer includes an element divider to analyze the at least two components and to generate a set of section definitions; and a section definer to create the at least one section based on the section definitions.

Further, in accordance with a preferred embodiment of the present invention, the manipulator tool is at least one dynamic handle.

Still further, in accordance with a preferred embodiment of the present invention, the at least one dynamic handle is a section elevator.

Additionally, in accordance with a preferred embodiment of the present invention, the manipulator tool is a manipulation window.

Moreover, in accordance with a preferred embodiment of the present invention, the UI subsystem includes a UI handle generator to add at least one of: at least one the dynamic handle to the generated at least one section and at least one elevator to at least one scroll bar of the at least one page.

Further, in accordance with a preferred embodiment of the present invention, the UI subsystem further includes a manipulation window manager to perform zooming and zoom-related calculations and to create the manipulation window.

Still further, in accordance with a preferred embodiment of the present invention, the system includes a UI runner to present the generated at least one section to the user with at least one of: the at least one dynamic handle and the least one elevator on at least one scroll bar of the at least one page.

Additionally, in accordance with a preferred embodiment of the present invention, the system also includes a UI runner to present the generated at least one section to the user with the manipulation window.

Further, in accordance with a preferred embodiment of the present invention, the page analyzer also performs analysis based on at least one of semantic analysis, editing history, content and attributes of the at least two components.

Still further, in accordance with a preferred embodiment of the present invention, the edit is at least one of removing, modifying, adding, re-ordering, moving, updating and inserting the at least one section.

Additionally, in accordance with a preferred embodiment of the present invention, dynamic layout rules are at least one of: between the section and at least one other section, between the section and at least one other component of the at least one page and between the at least two components of the at least one page.

Moreover, in accordance with a preferred embodiment of the present invention, the visual design system is at least one of: a website building system, a desk top application development environment, a mobile application development environment, a client server application development environment, a non-browser web application development environment, a plug-in development environment and a shop-builder.

Further, in accordance with a preferred embodiment of the present invention, the manipulation window manager performs zooming based on at least one of: section and page size and the amount of required content.

There is provided in accordance with a preferred embodiment of the present invention, a method for a visual design system implementable on a computing device, the device including a processor and a memory. The method includes editing a visual creation with absolute positioning including at least one page having a least two components during an editing session; performing at least geometrical analysis on the at least two components and dividing the at least one page into at least one section according to the analysis; generating and presenting each at least one section as a virtual container and generating at least one section manipulator tool to enable a user to perform manipulation on the at least one section; and regenerating the at least one page based on the manipulation to the at least one section and at least according to dynamic layout rules.

Moreover, in accordance with a preferred embodiment of the present invention, the performing at least geometrical analysis includes analyzing the at least two components and generating a set of section definitions; and creating the at least one section based on the section definitions.

Further, in accordance with a preferred embodiment of the present invention, the manipulator tool is at least one dynamic handle.

Still further, in accordance with a preferred embodiment of the present invention, the at least one dynamic handle is a section elevator.

Additionally, in accordance with a preferred embodiment of the present invention, the manipulator tool is a manipulation window.

Moreover, in accordance with a preferred embodiment of the present invention, the generating at least one section manipulator tool includes adding at least one of: at least one dynamic handle to the generated at least one section and at least one elevator to at least one scroll bar of the at least one page.

Further, in accordance with a preferred embodiment of the present invention, the generating at least one section manipulator tool includes performing zooming and zoom-related calculations and creating the manipulation window.

Still further, in accordance with a preferred embodiment of the present invention, the method includes presenting the generated at least one section to the user with at least one of: the at least one dynamic handle and the at least one elevator on the at least one scroll bar of the at least one page.

Additionally, in accordance with a preferred embodiment of the present invention the method includes presenting the generated at least one section to the user with the manipulation window.

Moreover, in accordance with a preferred embodiment of the present invention, the performing is also based on at least one of semantic analysis, editing history, content and attributes of the at least two components.

Further, in accordance with a preferred embodiment of the present invention, the edit is at least one of removing, modifying, adding, re-ordering, moving, updating, inserting the at least one section.

Still further, in accordance with a preferred embodiment of the present invention, the dynamic layout rules are at least one of: between the section and at least one other section, between the section and at least one other component of the page and between the at least two components of the at least one page.

Additionally, in accordance with a preferred embodiment of the present invention, the visual design system is at least one of: a website building system, a desk top application development environment, a mobile application development environment, a client server application development environment, a non-browser web application development environment, a plug-in development environment and a shop-builder.

Moreover, in accordance with a preferred embodiment of the present invention, the zooming is based on at least one of: section and page size and the amount of required content.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a schematic illustration of the use of specific handles to modify the distance specified for an existing anchor;

FIGS. 17A and 17B detail an algorithm for page sectioning; constructed and operative in accordance with the present invention;

FIG. 20 is a schematic illustration of section snapping during editing; constructed and operative in accordance with the present invention;

FIG. 31 is a schematic illustration of a "chocolate table" style website layout.

Figure 1:
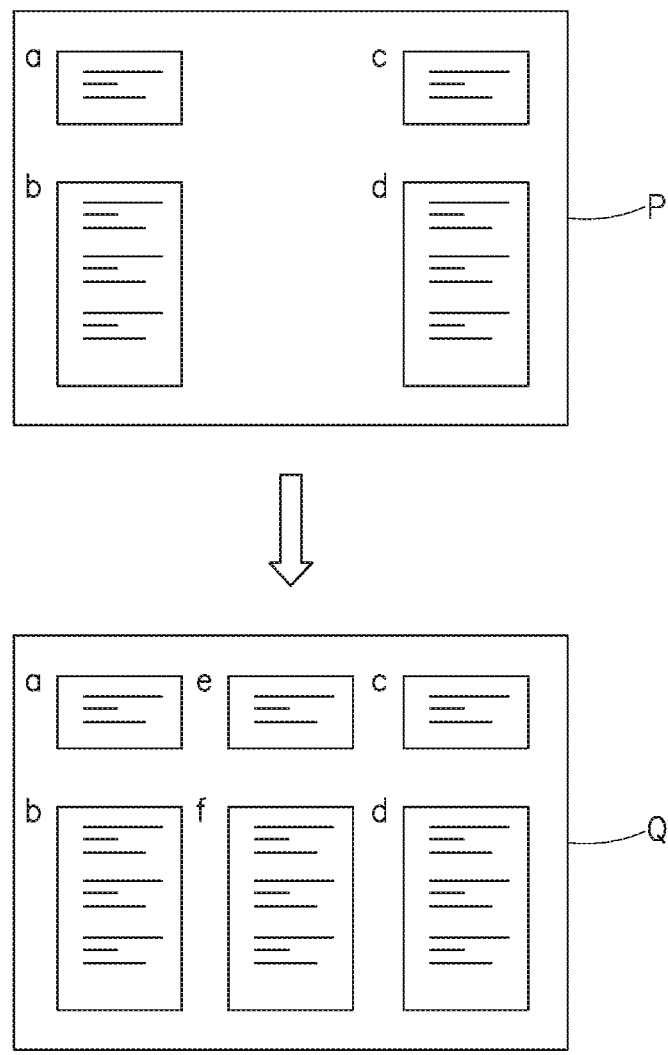
FIG. 1 is a schematic illustration of the use of absolute positioning in web page design.
Figure 2:
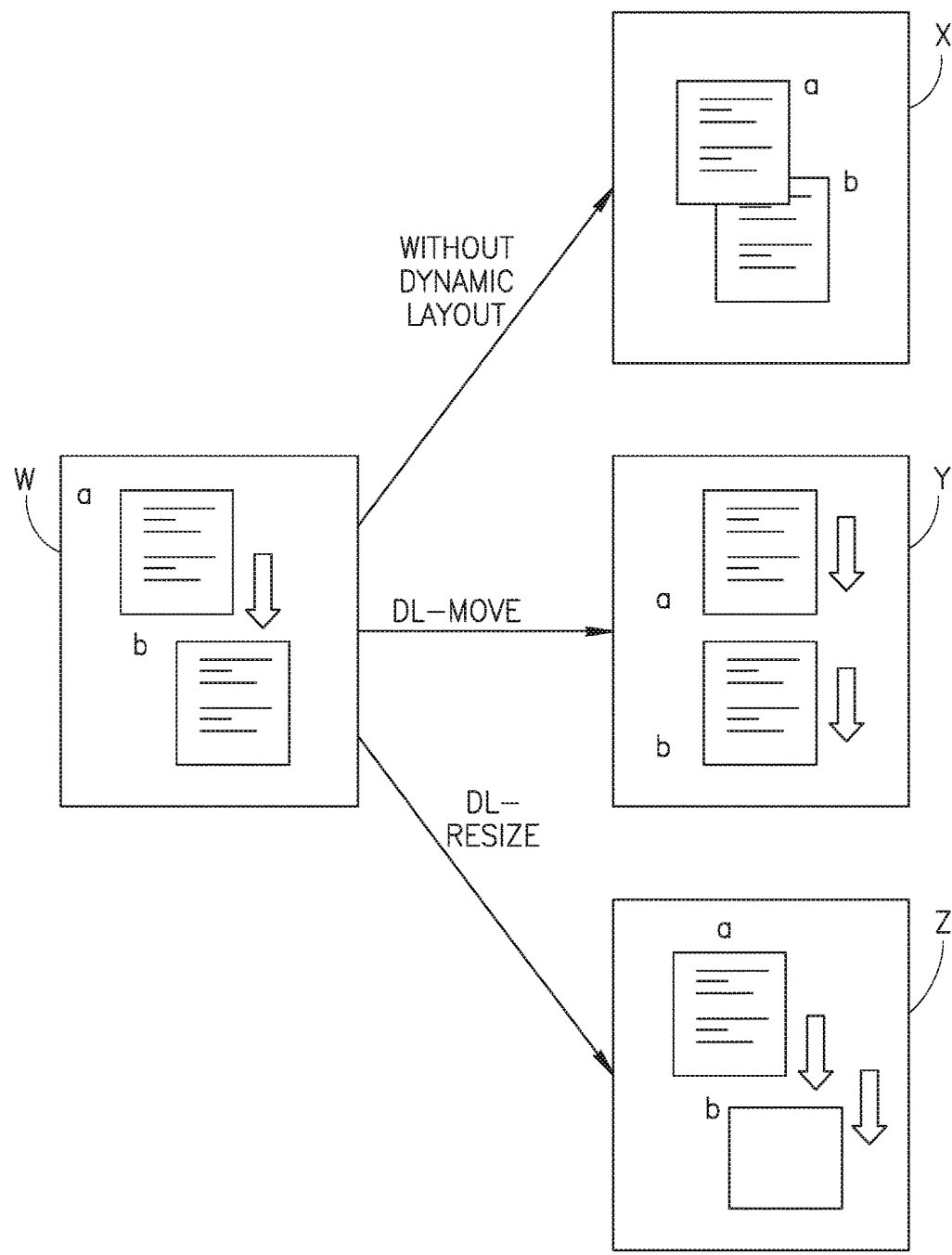
FIG. 2 is a schematic illustration of the use of dynamic layout during online editing.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated, that in existing systems known in the art, there are often multiple and complex rules governing the application of dynamic layout. These can involve anchors or constraints specified by the designer, as well as those created automatically or semi-automatically by the system. A dynamic layout system excels at handling changes to a substantially complete application page, i.e. when local changes are applied to specific components and the designer would like to retain the general look and feel of the designed page, in particular when the design is substantially complete.

However, occasionally during page design, a designer may sometimes desire to make some sweeping changes to certain components—changes which could break the existing look and feel of the page design in order to create a new and better design. The situation may also be more complex—since there may be multiple pre-defined dynamic layout rules, and the designer may desire to modify a given component or set of components, activating some of the set dynamic layout rules and bypassing others.

Reference is now made to FIG. 3 which illustrates two components [a] and [b] anchored together by anchor E so that moving component [a] downwards would also move component [b] down. The designer would like to move the lower edge a1 of component [a] to be aligned with the bottom edges of components [c] and [d] without affecting component [b].

Figure 4:
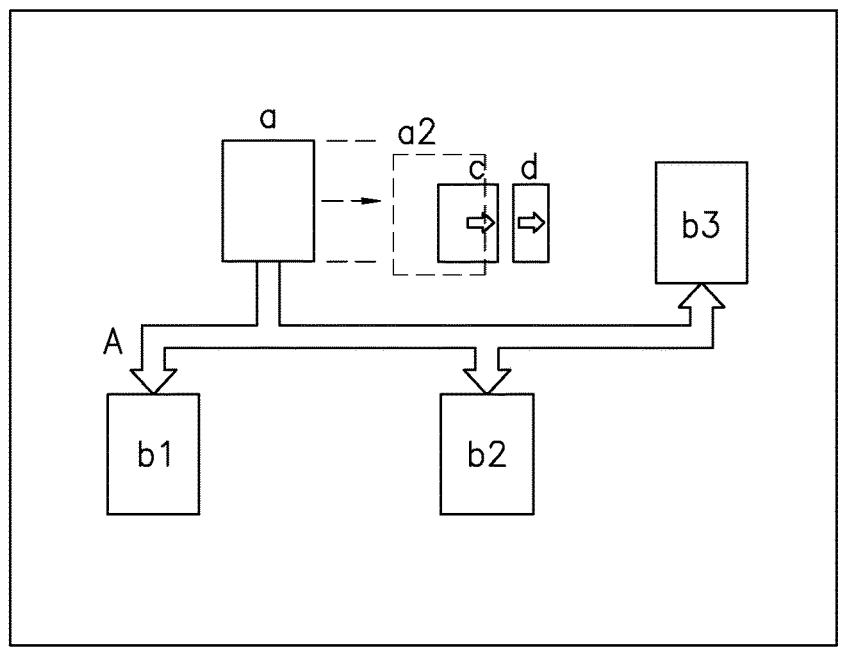
FIG. 4 is a schematic illustration of a specific handle to modify a complex, multi-component anchor.

Reference is now made to FIG. 4 which illustrates another example of a situation where the override of dynamic layout may be required. As is shown, component [a] is anchored to components [b1], [b2] and [b3] with anchor A. The designer would like to reposition component [a] to a new position (as shown by component [a2]) which differs in position both horizontally and vertically. The designer may also wish to keep anchor A intact without affecting or moving components [b1], [b2] and [b3] but may wish to move components [c] and [d] to the right.

It will be appreciated that often, a simple solution such as turning off dynamic layout during an editing session, does not provide a full solution to the range of exception to the rule scenarios, and many existing systems, do not provide this turn off option. Another simple solution—that of removing the anchors attached to the given component, editing the component and re-creating the anchors—might be extremely difficult to implement or use. Furthermore, some of the anchors may be automatic or semi-automatic and may not have been created by the designer himself making it more complicated for the designer to remove and restore them. In addition, this solution may become very labor intensive once components start to have numerous anchors attached to them.

Figure 5:
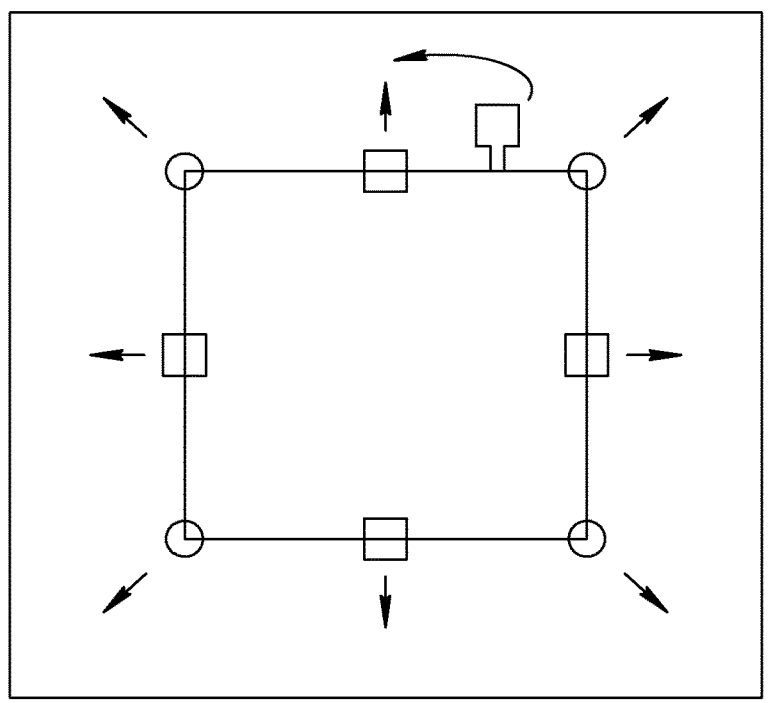
FIG. 5 is a schematic illustration of the use of adjustment handles for visual editing.
Figure 6:
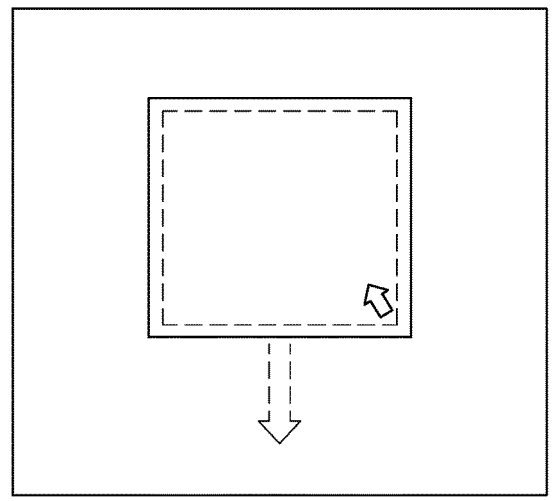
FIG. 6 is a schematic illustration of the use of the internal area of a component for position change.

It will also be appreciated that most visual design systems (and many other systems) use handles (also known as adjustment handles) as the main user interface device through which components are visually manipulated. Handles are typically provided in corners and/or edge centers of the components and allow for moving the components, resizing them and possibly rotating them as is illustrated in FIG. 5 to which reference is now made. Additional editing mechanisms may also be provided, such as (for example) a dialog box which allows for direct setting of a components' geometrical properties (such as height and width). These actions (move, resize and rotate) may sometimes be achieved using the non-handle regions of the component. In particular, many systems known in the art may allow component resizing by dragging any part of a component edge (e.g. MICROSOFT WORD table row and column resizing). Furthermore, many systems may allow a component to be moved by dragging any area inside the component as is illustrated in FIG. 6 to which reference is now made.

Applicants have realized that the use of multiple adaptable adjustment handles may be integrated with dynamic-layout rules to activate actions with different associated parameters. Applicants have further realized, that this may be of particular use in situations in which a single operation (such as "move component") may have multiple, widely divergent semantics due to the use of multiple, parameterized dynamic layout rules, and the combination of explicit and automatic anchors.

Figure 7:
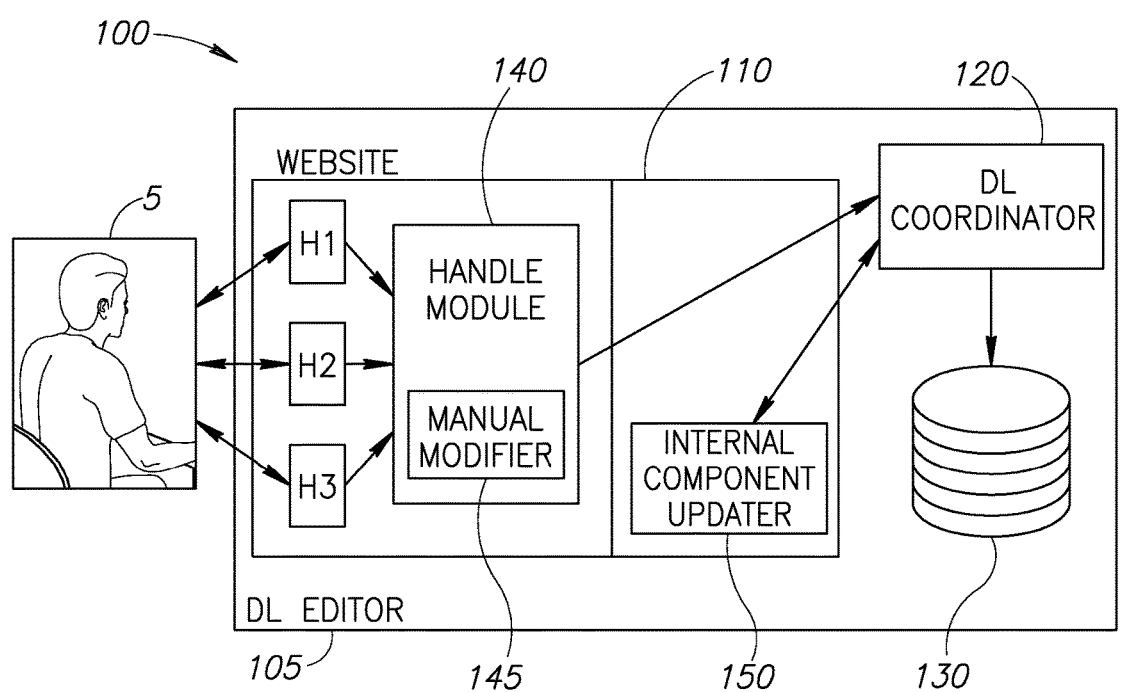
FIG. 7 is a schematic illustration of a system for using smart handles to trigger or to ignore dynamic layout rules for a particular component, constructed and operative in accordance with the present invention.

Reference is now made to FIG. 7 which illustrates a system 100 for using smart handles to trigger or to ignore dynamic layout rules for a particular component. For the sake of clarity, a web-based site editing system is used as an example of a visual design system. System 100 may comprise a dynamic layout editor 105 and a website 110. Dynamic layout editor 105 may comprise a dynamic layout coordinator 120 and a database 130. Database 130 may hold the dynamic layout rules associated with website 110, as well as information about the components, their content and their arrangement. Website 110 may comprise a handle module 140 and an internal component updater 150. Handle module 140 may comprise a manual modifier 145. It will be appreciated that website 110 may offer handles H1, H2 and H3 as part of its user interface to move and/or resize components. Handle module 140 may control the display of handles H1, H2 and H3 as well as interpret any changes made by a designer and/or a user to components via handles H1, H2 and H3. Manual modifier 145 may allow designer 5 to override the pre-defined display and/or functionality of handles H1, H2 and H3 as described in more detail herein below. It will be appreciated that system 100 may be installed locally or on a remote server accessed through a communication medium (as described in more detail herein below). For the sake of clarity, a system 100 installed locally is discussed.

User 5 may decide to manually adjust the size, shape or position of a particular component X using the available handles (H1, H2 and H3) provided by website 110 for component X. Handle module 140 may receive any changes made by user 5 using handles H1 and H2 and may pass this information to dynamic layout coordinator 120. It will be appreciated that a handle triggered event may include actions associated with a single handle or with multiple handles. Dynamic layout coordinator 120 may then check within database 130 to see if there are any dynamic layout rules pertinent to component X such as anchoring to a nearby component. Dynamic layout coordinator 120 may then inform internal component updater 150 of any pertinent changes to be made to component X and/or any other components. Internal component updater 150 may then execute the required adjustments. It will be appreciated that handle H3 may be a dynamic layout override handle and therefore may not trigger any visible dynamic layout activity but may still cause internal dynamic layout activity such as changing the length of an anchor etc. Handle H3 may therefore allow for a component to be moved or resized, without affecting any neighboring components.

It will be appreciated that there may be two possible conventions for using smart handles in conjunction with dynamic layout rules. The first is dynamic layout by default in which the regular adjustment handles provided for the components act as triggers for dynamic layout activity. Separate handles may also be provided that purposely bypass the dynamic layout triggering either completely or for specific anchors and/or rules. The second convention is no dynamic layout by default. In this scenario, regular handles do not trigger dynamic layout events and specific handles are provided that do trigger dynamic layout events. A combination of both conventions may also be used.

It will be further appreciated that a designer may differentiate between the various different handle types as discussed hereinabove using any type of visual attribute (such as shape, color or animation), their position on the edge component in question or via a pop up message or graphics symbol which may pop up as the mouse approaches the handle area. It will be also appreciated that handles may be invisible or virtual having different display methods such as using a specific area (internal or external to the actual component area) as a handle, using part of another control structure (such as the component boundary) to provide an additional handle function, and using another area or component element as above and having the area change some visual property upon mouse approach, mouse over or mouse click.

Figure 8:
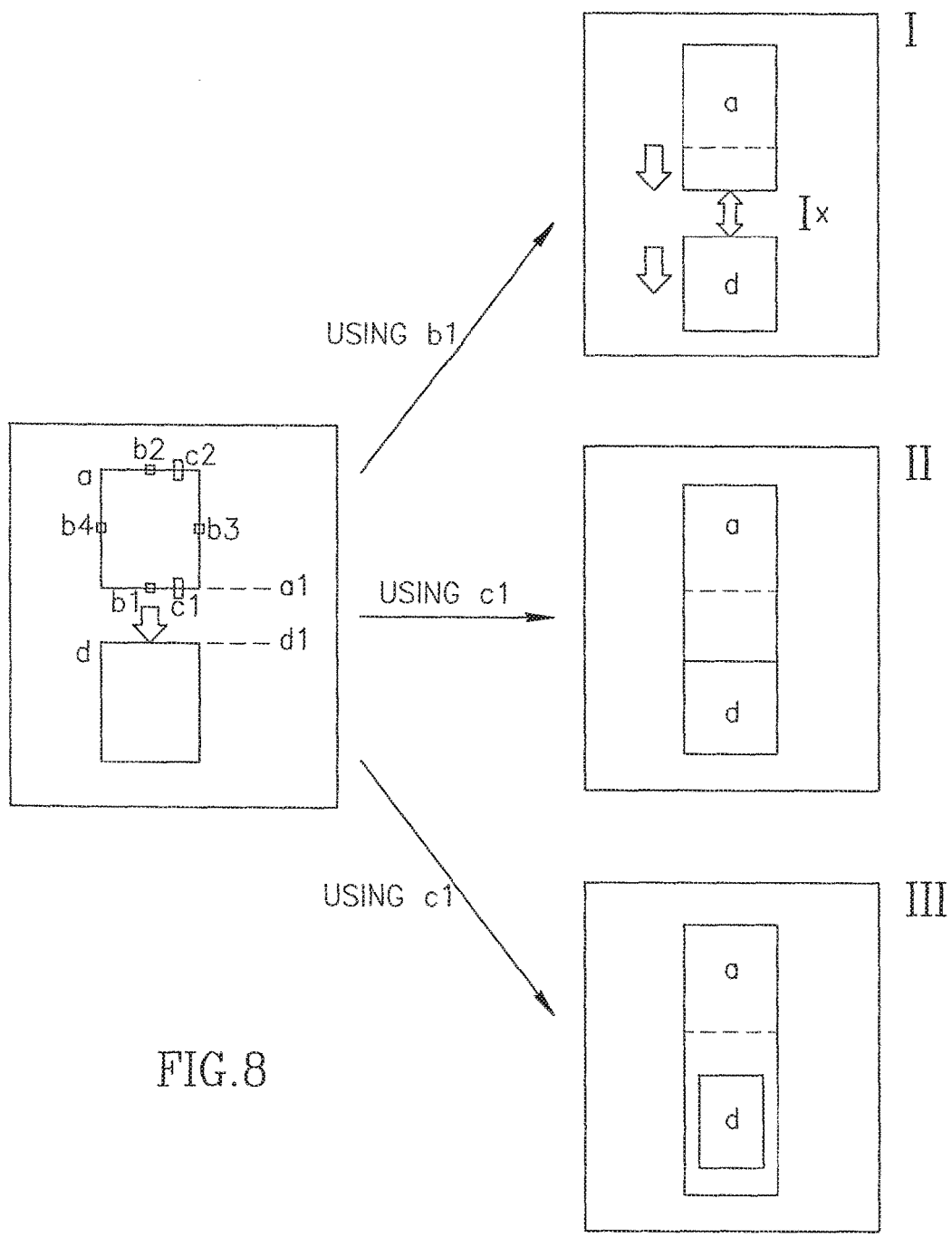
FIG. 8 is a schematic illustration of the use of multiple handles to enable or disable dynamic layout use for automatic anchoring, constructed and operative in accordance with the present invention.

It will be appreciated that visual editing systems typically provide specific handles for the main design functions such as moving and resizing. Therefore in order to control an automatic anchor, a different handle may be provided for each desired function which may override any dynamic layout rules and be outside the rules. Reference is now made to FIG. 8 which illustrates an example of dynamic layout by default convention for automatic anchors. Component [a] has four regular sized handles b1 (down), b2 (up), b3 (right) and b4 (left). Component [a] may also have additional down/up dynamic layout override resize handles c1 (down) and c2 (up), which only appear in the specific directions in which dynamic layout is available i.e. where component [a] may have an automatic anchor. In scenario I, when component [a] is extended downwards, using regular handle b1, system 100 may be triggered, creating an automatic anchor between a1, the lower edge of component [a] and d1, the upper edge of component [d], once the distance between a1 and d1 becomes smaller than a threshold value x. When this happens, component [a] may push component [d] downwards to make space for the expansion of component [a]. In scenarios II and III, resize handle c1 is used instead of the regular handle b1, thus overriding any preset dynamic layout rules and allowing for component [d] to remain in the same position whether component [a] is resized downwards towards component [d] (scenario II) or overlaps component [d] completely (scenario III).

Figure 9:
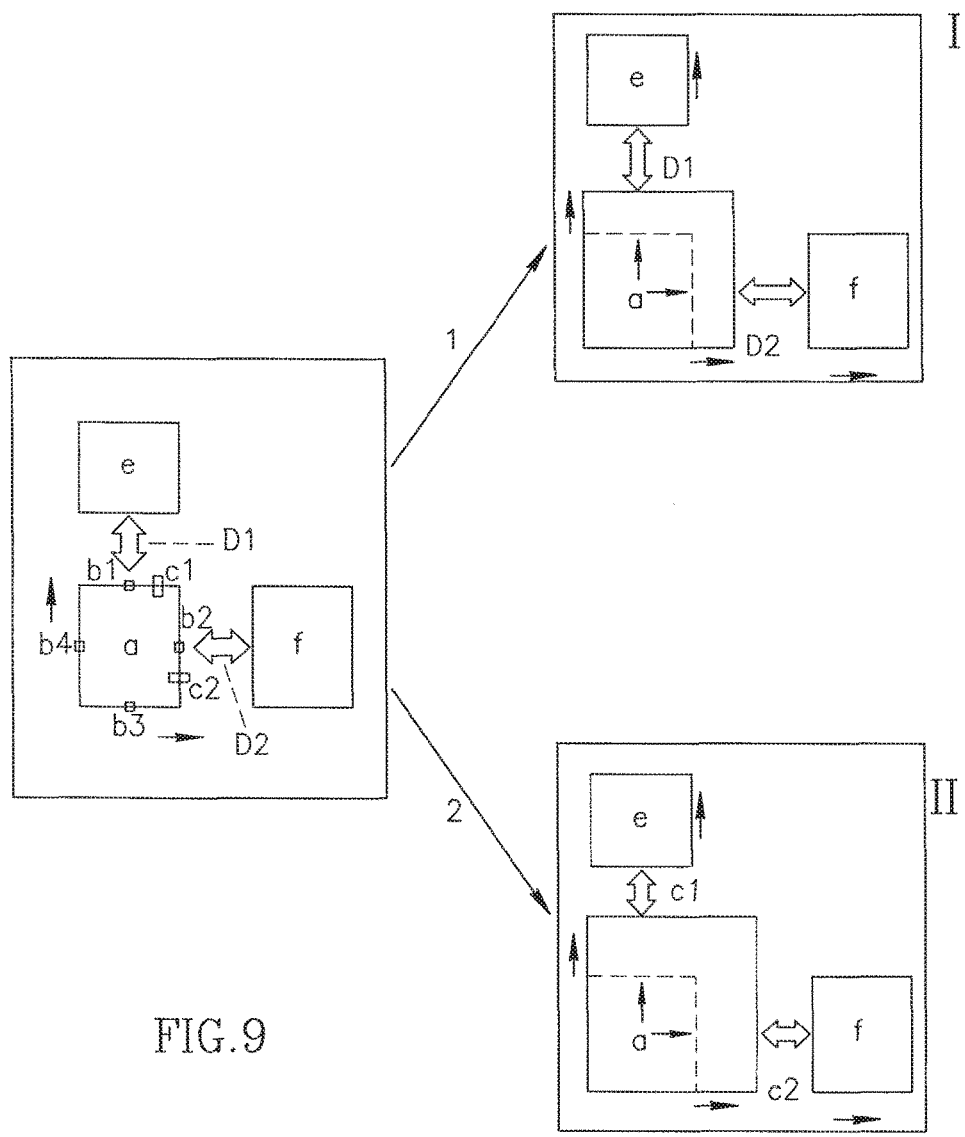
FIG. 9 is a schematic illustration of the use of multiple handles to enable or disable dynamic layout use for explicit anchoring, constructed and operative in accordance with the present invention.

Explicit anchors may be handled in a similar manner. It will be appreciated that explicit anchors are permanent until removed by the designer. The additional adjustment handles may only appear on the edges which have explicit anchors and not on the edges that do not. Reference is now made to FIG. 9 which illustrates an example of dynamic layout by default convention for explicit anchors. Component [a] has regular resize handles (b1, b2, b3, b4) on all four edges but has dynamic layout override resize handles c1 and c2 only on the top and right edges to which the explicit anchors are connected. In scenario I, a resize of component [a] upwards or to the right using handles b1 or b2, may activate explicit anchors D1 and D2 (respectively) and may move components [e] and [f] accordingly. In scenario II, a resize using handles c1 and c2 may resize component [a] without affecting components [e] and [f].

Figure 10:
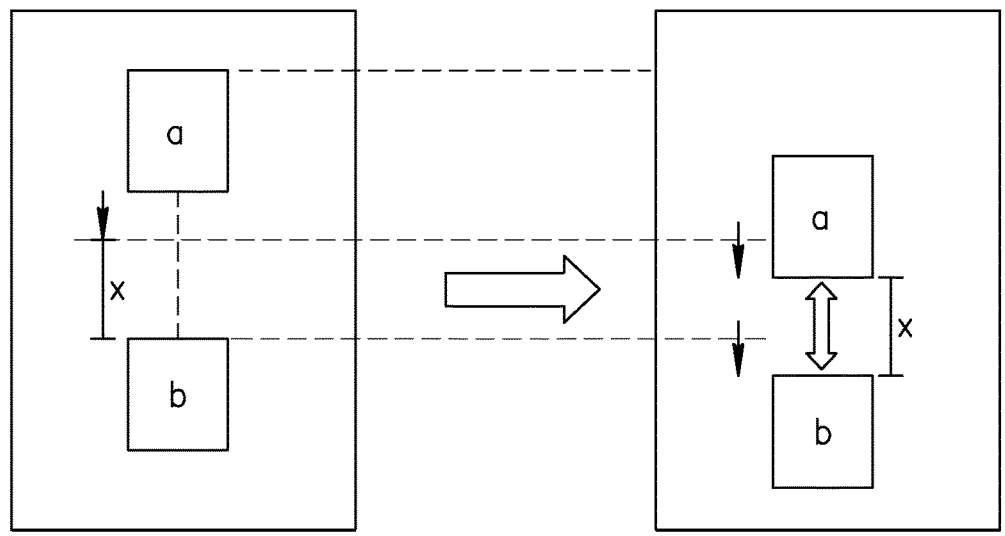
FIG. 10 is a schematic illustration of proximity-based automatic anchor creation, constructed and operative in accordance with the present invention.
Figure 11:
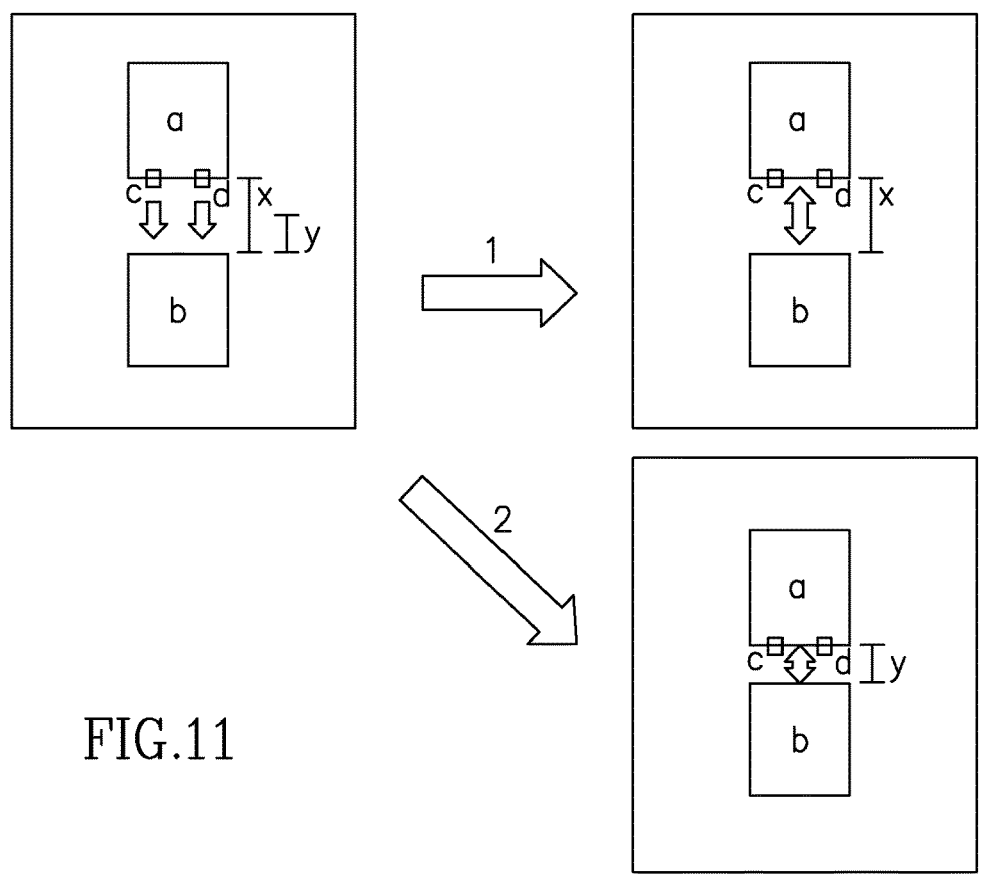
FIG. 11 a schematic illustration of the use of multiple handles to specify different proximity thresholds for proximity-based automatic anchor creation, constructed and operative in accordance with the present invention.

It will be appreciated, that website 110 may display multiple handles which may cause system 100 to use different parameters values for the same layout rules. Reference is now made to FIG. 10 which illustrates a dynamic layout rule in which component [a] is moved and reaches a distance of less than X pixels from component [b], creating an automatic anchor between components [a] and [b] and pushing component [b] downwards accordingly. However website 110 may provide two different types of handles (c and d) for dealing with component [a] as is illustrated in FIG. 11 to which reference is now made. When handle c is used to move the bottom edge a1 of component [a] downwards as is illustrated in scenario I, the value of X is used as the distance threshold. Likewise, when handle d is used, the value of Y is used as the distance threshold. In this manner, the designer may move components around and enjoy the benefits of dynamic layout during editing and easily create area where components are densely situated amongst each other or are widely spaced apart. These may be achieved without having to switch between system modes, or perform multiple per-component or per anchor setting changes during editing.

It will be appreciated that different handles may be employed by website 110 to control whether dynamic layout rules are to be activated or not and that the rules themselves may vary from handle to handle. It will be further appreciated that handles may be assigned for specific rules or groups of rules. Handles may also be assigned which deactivate or override existing rules or groups of rules. It will be further appreciated that a user or designer may map handles to rules at different levels such as at the entire system level, at a specific application level (such as part of the application creation information) or even at page, container, component or component class level. Handles may also be automatically configured by system 100 via handle module 140 based on which rules are applicable to a particular component based on the type and position of the component within a page as well as according to existing anchors, nearby components or any other criteria. Handles may also be automatically configured based on the history of the use of rules and/or handle types by a specific user. For example, system 100 may provide rules for dynamic layout of horizontal edges and the dynamic layout of vertical edges. Two types of handles may be provided. The first type may allow the movement of a component while taking all rules into account including both horizontal edge and vertical edge anchors. The second type may allow the movement of a component while taking into account horizontal edge rules only and ignoring the vertical edge rules. Thus a designer may move a component around, activating all relevant rules which affect horizontal edges and individually determining which vertical edge rules to use. The functionality of handles may also be reconfigured manually by designer 5 using a keyboard, mouse or touch screen. In this scenario, manual modifier 145 may override the pre-defined functionality for the pertinent handle as held in handle module 140.

Figure 12:
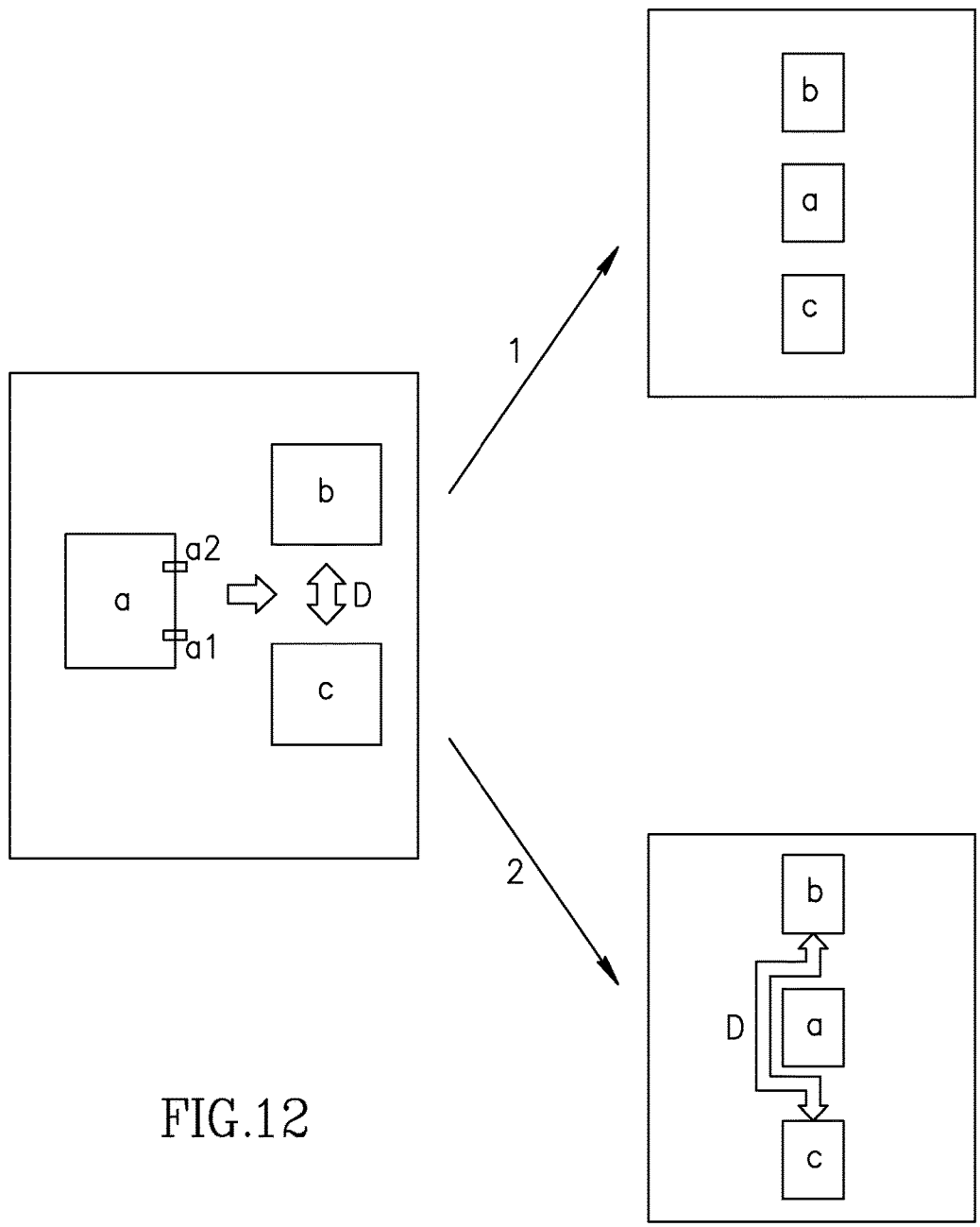
FIG. 12 is a schematic illustration of the use of multiple handles to control an explicit anchor breaking rule, constructed and operative in accordance with the present invention.

Reference is now made to FIG. 12 which represents a component [a] that has been moved between components [b] and [c]. Components [b] and [c] are anchored together by anchor D. In scenario I, component [a] is moved using handle a1, thus breaking anchor D. In scenario II, component [a] is moved using handle a2 and anchor D is not broken.

It will be appreciated that visual editing systems sometimes allow an end-user (rather than the designer) to perform limited layout editing operations by directly manipulating the size and/or the position of some of the components, thus requiring dynamic layout adjustment during run-time to compensate for user changes. It will be further appreciated, that website 110 may display different sets of handles to designers and end-users. For example, system 100 may provide handles that bypass dynamic layout (completely or just specific rules) for designer use and only regular dynamic layout handles to end-users. System 100 may provide handles to all components for designers and only to specific components for end-users. System 100 may also provide a set of handles with specific parameters to designers and a set of handles with different, more limiting parameters to end-users.

It will also be appreciated that if multiple adjustment handles are provided to a particular component, the visual overload may become too large, in particular for small components or small component edges which may have insufficient space for multiple handle attachment. One way of reducing the number of required handles may be through the use of multiple handle selection. In this mode of use, each handle may have a different specific function. The designer may desire to use the functions mapped to multiple handles and apply them to a single operation performed on the component such as moving or resizing it. This may be achieved by performing a multiple selection operation to perform multiple selection among the handles available on a given specific component or component edge. The use of multiple handle selection, may allow (for example) three handles to represent seven different function combinations ($7=2^3-1$).

It will also be appreciated that the number of handles in use may be reduced by dynamically displaying only the most relevant handles. An example of this (as described herein above) is a resize handle which affects explicit anchors being displayed only for edges which have such explicit anchors. Other criteria may be used to reduce handle display such as handles displayed based on rules applicable for a given component based on the component type, position, neighboring components etc. Handles may also be displayed according to their history of use, for example handle types used more recently by a designer would have a higher priority than those rarely used. For all the above mentioned cases, a display priority may be assigned and only handles with the higher priorities are displayed.

An alternative method of reducing the number of handles displayed is the use of a mouse, keyboard or screen gestures in conjunction with the use of specific handles in order to move/remove them. Examples may include handle dragging while holding down a given keyboard key to change the handle's function and handle dragging while holding down a mouse key for a mouse equipped with additional control keys. Other examples may include but are not limited to dragging a component or edge using a touch screen and performing a preliminary click on any screen modifier area or button with the effect being either continuous (until pressed again) or limited to the predefined dynamic layout operation performed right after the preliminary click. It will be appreciated that manual modifier 145 may perform this manual override of the handle display parameters held in handle module 140.

It will be appreciated that the implementation of multiple handles may be performed using handle module 140 in conjunction with website 110. It will be appreciated that the handles may be created using the different definitions as in described hereinabove such as handles mapped to specific dynamic layout rules, handles which depend on the existence of specific anchor types, handles defined by the user and mapped to given dynamic layout rules and handles based on user handle use history. Handle module 140 may instruct website 110 to display all applicable handles. Handle module 140 may also instruct website 110 to display a narrower set of handles according to different priorities as described hereinabove. It will be appreciated that the display of handles may be suppressed altogether (for handles which are completely invisible or virtual) or may be conditional based on mouse position etc.

Figure 13:
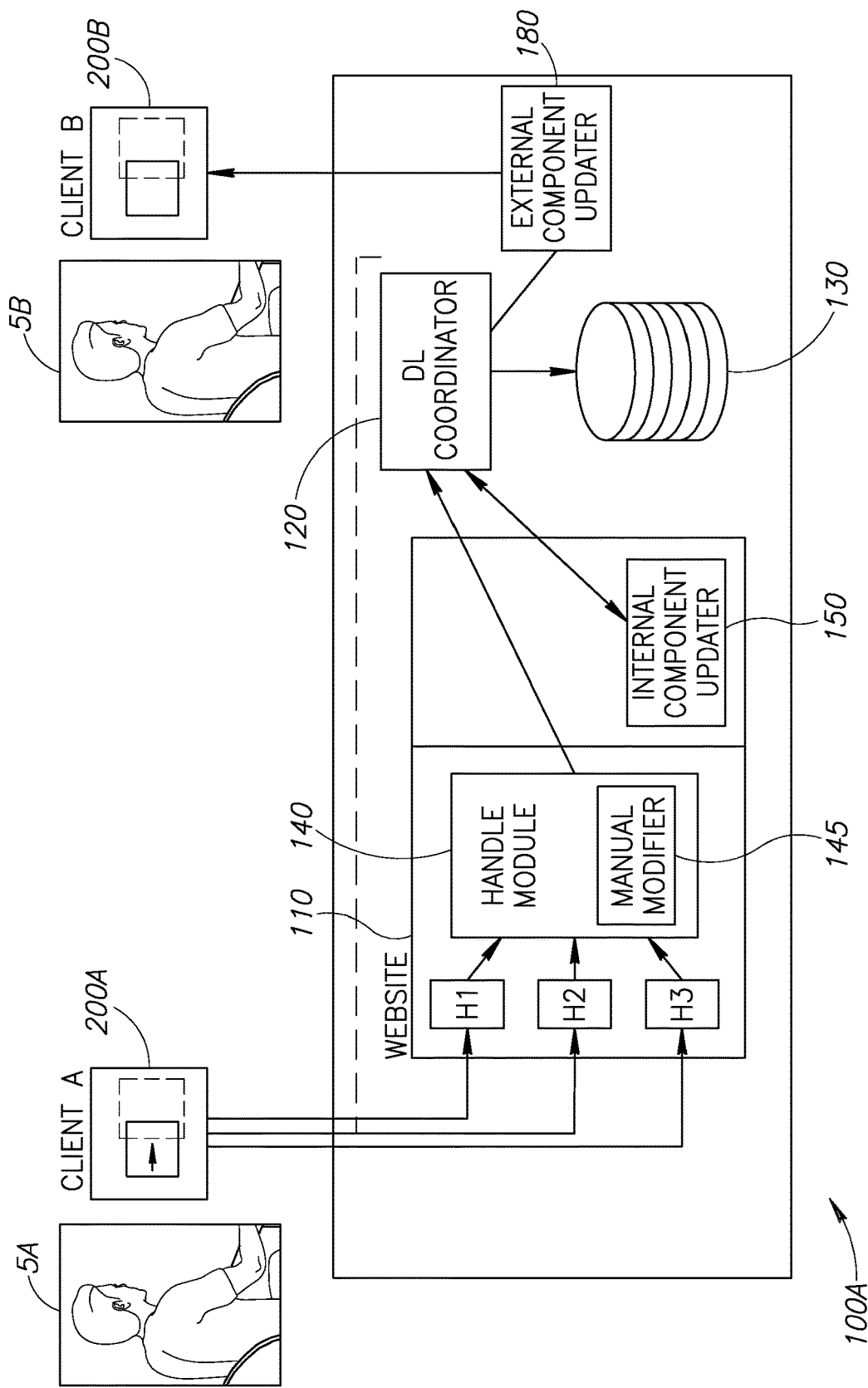
FIG. 13 is an alternative embodiment to the installation of the system of FIG. 7, constructed and operative in accordance with the present invention.

In an alternative embodiment to the present invention, system 100 may be installed on a remote server which may allow website 110 to be accessible to more than one user concurrently. It will be appreciated that user 5A working on client 200A may use handle H1 to trigger a dynamic layout event that may require not only an update for a particular component on his screen but also to the screen of client 200B which user 5B may be viewing. Reference is now made to Fig. 13 which illustrates system 100A, an alternative embodiment to system 100 for using smart handles to trigger or to ignore dynamic layout rules for a particular component. In this scenario it will be appreciated that dynamic layout coordinator 120, may instruct internal component updater 150 to update component X locally on client 200A and also instruct external component updater 180 to update component X displayed on client 200B. It will also be appreciated that system 100 may be integrated with a larger software system (such as FACEBOOK) so as to provide a rich media application for editing, layout and display services inside that larger software system.

As discussed herein above, system 100 describes the use of specialized handles to perform operations (such as move or resize) on page elements in visual design systems which support dynamic layout. The elements may include components and containers.

As described herein above, visual design systems may be used to edit visual creations such as websites, mobile application and stand-alone applications. Such visual design systems may include website building systems; desktop application development environments (e.g. for use with personal computers); mobile application development environments (e.g. for use with Smartphones and tablets); client-server application development environments and non-browser web application development environments (for use with environments such as Adobe's FLASH PLAYER); plug-in development environments, systems which create plug-ins and other add-on elements for other systems (web browsers or otherwise) and shop-buildering systems which focus on the creation of e-shops (or e-commerce sites). The discussion below focuses on the specific embodiment in which a website building system is used to create and edit websites, but may be applied (with the relevant changes) to any visual design system used to create and edit a visual creation.

It will also be appreciated that the use of specialized handles is important, since the various page elements may be connected to each other through dynamic layout connections, also known as anchors (e.g. if a given element grows downwards, push the element below it downwards). Such anchors may be explicitly specified or implicitly created.

Thus, simple moving or resizing of elements might affect other anchored elements. It will be therefore appreciated that the special added smart handles as described herein above, may disable or enable specific dynamic layout rules and anchors, and may allow editing to take place without disturbing other elements or otherwise causing them to move in an unintentional manner.

Applicants have realized that in an alternative embodiment, system 100 may be extended to a system that can divide a page into sections for editing purposes, and that can also define a particular operation for the sections (such as section addition, deletion and re-ordering). It will be appreciated that these operations may function in the context of absolute positioning systems and for dynamic layout based systems in particular. Such functionality is particularly useful with websites consisting of one (or more) long pages, with each page containing multiple sections (or strips as described below). Such site arrangements have become popular in both desktop and mobile web site designs.

Applicants have also realized that system 100 may also be extended by adding the ability for automatic virtual container creation for the sections, with these virtual containers having their own automatically-generated smart handles. Such a virtual container may be defined using an analysis of the components in a given area and their attributes and content as well as their geometrical, semantic or other relationships and editing history.

Applicants have further realized that system 100 may be further extended to add an automatic zooming functionality integrated with the element editing operations. Such functionality may be automatically activated when a relevant smart handle is used, may be activated in conjunction with specific user gestures or operations (not necessarily related to smart handles) or may be explicitly activated by user 5 as further described herein below.

It will be appreciated that the above mentioned extensions to system 100 may be combined together or may be applied individually.

Figure 14:
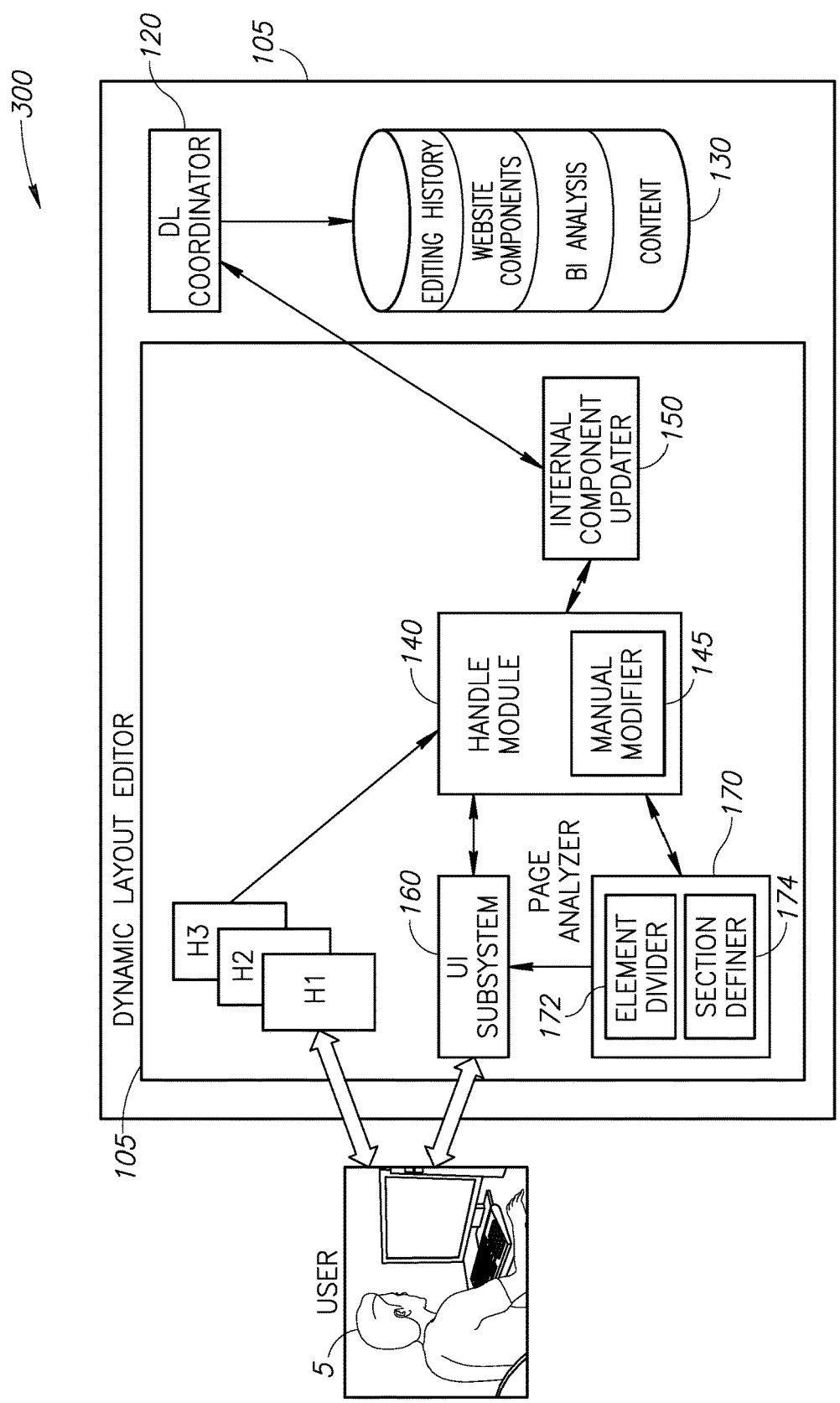
FIG. 14 is a schematic illustration of a system for section-based editing of a website page, constructed and operative in accordance with the present invention.
Figure 15:
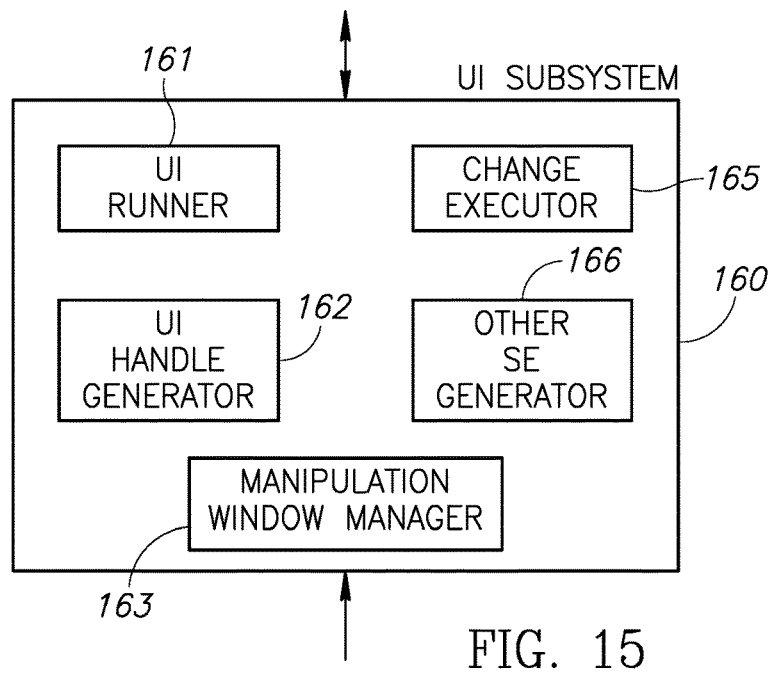
FIG. 15 is a schematic illustration of the elements of the UI subsystem of FIG. 14, constructed and operative in accordance with the present invention.

Reference is now made to FIG. 14 which illustrates a system 300 for section-based editing of a website page according to an embodiment of the present invention. It will be appreciated that system 300 may supply manipulation tools to user 5 in order to edit configurations of his website page as described in more detail herein below.

System 300 may comprise a dynamic layout editor 105, a dynamic layout coordinator 120 and a database 130. Database 130 may hold website information and content for the pertinent website together with any associated dynamic layout rules, as described herein above. It will be appreciated that database 130 may also hold editing history pertaining to the components of the pertinent website together with relevant BI (business intelligence) that may have been gathered for the website. Dynamic layout editor 105 may further comprise a handle module 140, an internal component updater 150, a UI Subsystem 160 and a page analyzer 170. Handle module 140 may comprise a manual modifier 145. Page analyzer 170 may comprise an element divider 172 and a section definer 174. It will be appreciated that for the below mentioned discussion, the embodiment of a system 300 that is a website editing system is described. It will be further appreciated system 300 may be any of the systems as described herein above.

UI subsystem 160 may handle the interface between system 300 and user 5 during the editing session. UI subsystem 160 may comprise a UI runner 161, a UI handle generator 162, a manipulation window manager 163, a change executor 165 and other SE (section editing) generator 166. The functionality of these elements is described in more detail herein below. a14

It will be further appreciated that the functionality of dynamic layout editor 105, dynamic layout coordinator 120 and internal component updater 150 may be similar to their functionality as part of system 100 as described herein above in relation to FIG. 7.

It will also be appreciated that in this scenario, dynamic layout editor 105 may offer handles such as H1, H2 and H3 for user to manipulate sections (generated by UI subsystem 160 as described in more detail herein below) or another form of manipulation tool as part of its user interface to move and/or resize components, move and/or resize sections of the web page and to zoom in and out of a particular page. Handle module 140 may control the display of handles H1, H2 and H3 as well as interpret any changes made by a designer and/or a user to components via handles H1, H2 and H3 such as deleting sections, adding section etc. as described herein above and in more detail herein below. Manual modifier 145 may allow designer 5 to override the pre-defined display and/or functionality of handles H1, H2 and H3 as described herein above. It will be appreciated that system 300 may be installed locally on a client or on a remote server accessed through a communication medium (as described herein above). In an alternative embodiment the functionality for system 300 may also be divided between the client and the server in any manner. For the sake of clarity, a locally installed system 300 is discussed.

Page analyzer 170 may analyze incoming pages to generate section definitions. Element divider 172 may divide page components and other elements into subsets suitable for the creation of sections. It will be appreciated that the functionality of element divider 172 may be similar to that of the element divider described in U.S. Patent Publication No. 2015/0074516. Section definer 174 may create the sections according to the divisions provided by element divider 172.

UI subsystem 160 may handle the generation and presentation of the sections of the page together with dynamically generated handles (or other forms of user interfaces such as elevators on scroll bars and a manipulation) window as described in more detail herein below) needed to manipulate the sections as described in more detail herein below.

UI runner 161 may present the page to user 5 via the appropriate interface, manipulation window manager 163 may perform zooming and zoom-related calculations so to support dynamic zooming during section manipulation using a manipulation window, UI handle generator 162 may add smart handles to the sections for manipulation by the user and change executor 165 may execute any changes made by the user including the reordering of the sections of the page according to pre-defined rules. Other SE generator 166 may generate UI elements and manipulation tools which are not associated with any specific section as discussed in more detail herein below.

It will be appreciated that some website pages may consist of sectional strips, i.e. full screen width ("coast to coast") horizontal strips which are responsive to a browser horizontal window resize. Such strips may be constructed by user 5 (e.g. from a relevant strip background and additional components), and may also be offered as complete building blocks (which are automatically adapted to the page screen width) by the visual design system in use.

Figure 16:
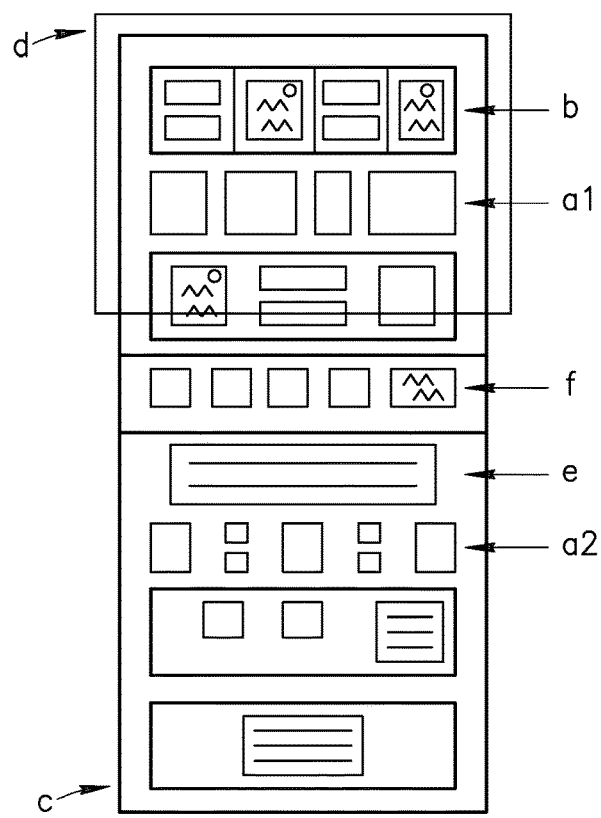
FIG. 16 is a schematic illustration of a strip-based webpage and its elements.

In one embodiment, the website page may be substantially longer then the screen, requiring vertical scrolling as is illustrated in FIG. 16 to which reference is now made. As is shown, page [c] is longer than browser window [d]. However, no horizontal scrolling would be required as page [c] may automatically adapt to the current width of the browser window [d] (which may be changed, for example, by browser window resizing, or displaying the web page on a different-width device).

It will be appreciated that page [c] may be divided into actual strips, i.e. may consist of multiple horizontal containers which contain the other components. The page may also consist of a combination of actual strips and sets of objects which together form a strip (but with no predefined enclosing strip container) as is illustrated by strips [a1] and [a2].

Some strips may be divided into multiple columns (which are also responsive to width changes) such as strip [b]. Such columns may have a pre-specified width, a calculated width based on the current strip width (e.g. "divide the strip into 3 equal columns") or a combination thereof.

Strips may be also based on containers or components occupying a different portion of the screen width such as strips [e] and [f]. A strip may also be defined through a wide background object (such as color, pattern, image or video display window) combined with additional foreground elements.

As discussed herein above, some website building systems may support the construction of website pages which include pre-defined sections or strips (horizontally or vertically based) as well as components not arranged as sections. It will be appreciated that in the case of pages or page organizations which do not consist entirely of sections, page analyzer 170 may be required to analyze incoming pages so that section definitions can be calculated in order to generate the sections accordingly.

Element divider 172 may divide the components of the website page being analyzed into sections, i.e. may perform page sectioning. It will be appreciated that in the case of a page that already includes section definitions the process would generally employ these section definitions.

As discussed herein above, some visual design systems may use pre-defined sections (e.g. created when components are added or inserted into the page being built). This can be done (for example) for sections created using pre-defined "section containers". Such containers may use a special container class or a specific attribute in the container property settings. However, working with such a system may require continuous maintenance of the section definitions.

It will be appreciated that page analyzer 170 may perform automatic page sectioning. Element divider 172 may analyze the components on the page and automatically generate the set of section definitions. The division into sections may change (automatically) as components are added, removed or modified.

It will be further appreciated that system 300 may handle the generated section definitions as virtual containers. Virtual containers may be similar to regular containers but may include a set of components which are not members of any actual container in the underlying visual design system. System 300 may maintain these virtual container definitions temporarily (e.g. to save work on repeated analysis of unmodified page areas), without regarding them as regular (permanent) containers.

These created virtual containers can then be manipulated by user 5, e.g. through generated manipulation handles, as described in more detail herein below.

It will be appreciated that pre-defined dynamic layout rules pertaining to components as described herein above and in U.S. Patent Publication 2013/0219263, may also be applied to the created virtual containers or sections. An example is the creation of automatic anchors when moving a component or section within a pre-defined proximity of another section or component. It will be further appreciated that in the case of pre-defined sections, explicit rules may also be predefined. It will be further appreciated that the dynamic layout editor 105 may implement different rules or rule parameters for regular components or containers, pre-defined sections and virtual container sections.

Section definer 174 may use a page sectioning algorithm such as illustrated in FIGS. 17A and 17B to which reference is now made. It will be appreciated that the algorithm described focuses on the common embodiment which divides the entire page into horizontal strips. It will also be appreciated that the same algorithm may be applied to other division types as well (e.g. vertical strip division, 2 dimensional divisions or dividing just a sub-region of the page). As can be seen, the algorithm uses clustering techniques (i.e. it separates elements in a single or multi-dimensional space into groups which are "closer together" than the intra-group space), also taking into account containment relationships and predefined sections.

Reference is now made to section 5b in FIG. 17A, which shows how the algorithm may create non-inclusive sections containing elements protruding from them, as long as over 50% of the component area is inside the section. It will be appreciated that system 300 may use any variant of this criteria i.e. including only elements with over X % contained inside the section, limiting the maximal protrusion to Y pixels or to Z % of the section height etc. In an alternative embodiment, system 300 may ban protruding elements altogether, allowing only inclusive sections to be created.

It will be appreciated that section definer 174 may also use other clustering or grouping algorithms. A basic algorithm may employ a combination of the following heuristics: header and footer are regarded as sections; specialized UI widgets (e.g. an automatically-added mobile toolbar) are regarded as sections; predefined full-width elements are regarded as sections; elements predefined as sections (even if not full width) are regarded as sections and wide elements (over X % of width) may also be regarded as sections.

Thus section definer 174 may perform a horizontal division of the page (i.e. using a series of horizontal dividers to create a set of sections). It will be appreciated that the dividers may run from one side to the other side of the screen; do not intersect with components and that the components on each side of the divider have a minimal distance from the divider line.

Figure 18:
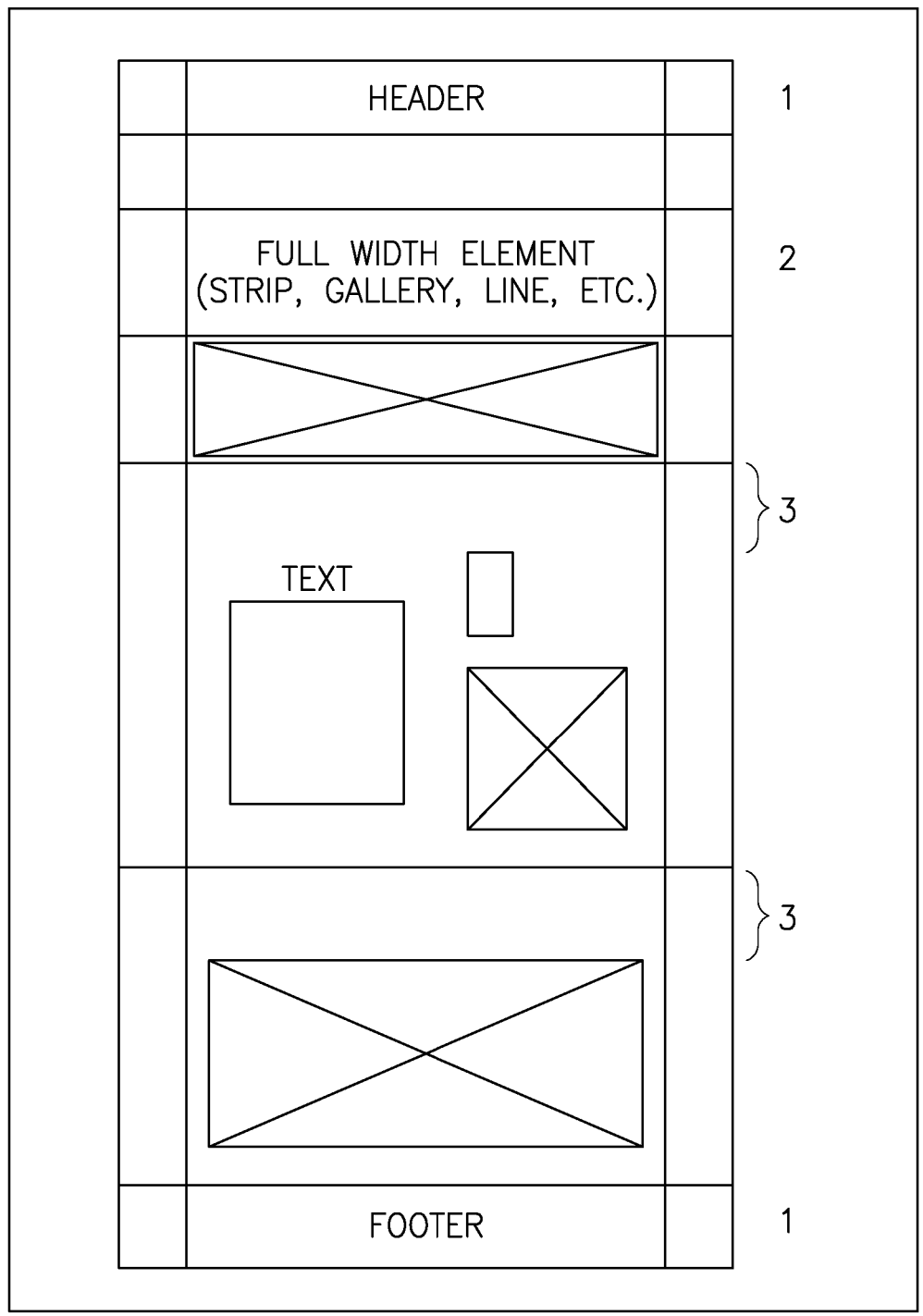
FIG. 18 is a schematic illustration of page analysis using horizontal dividers; constructed and operative in accordance with the present invention.
Figure 19:
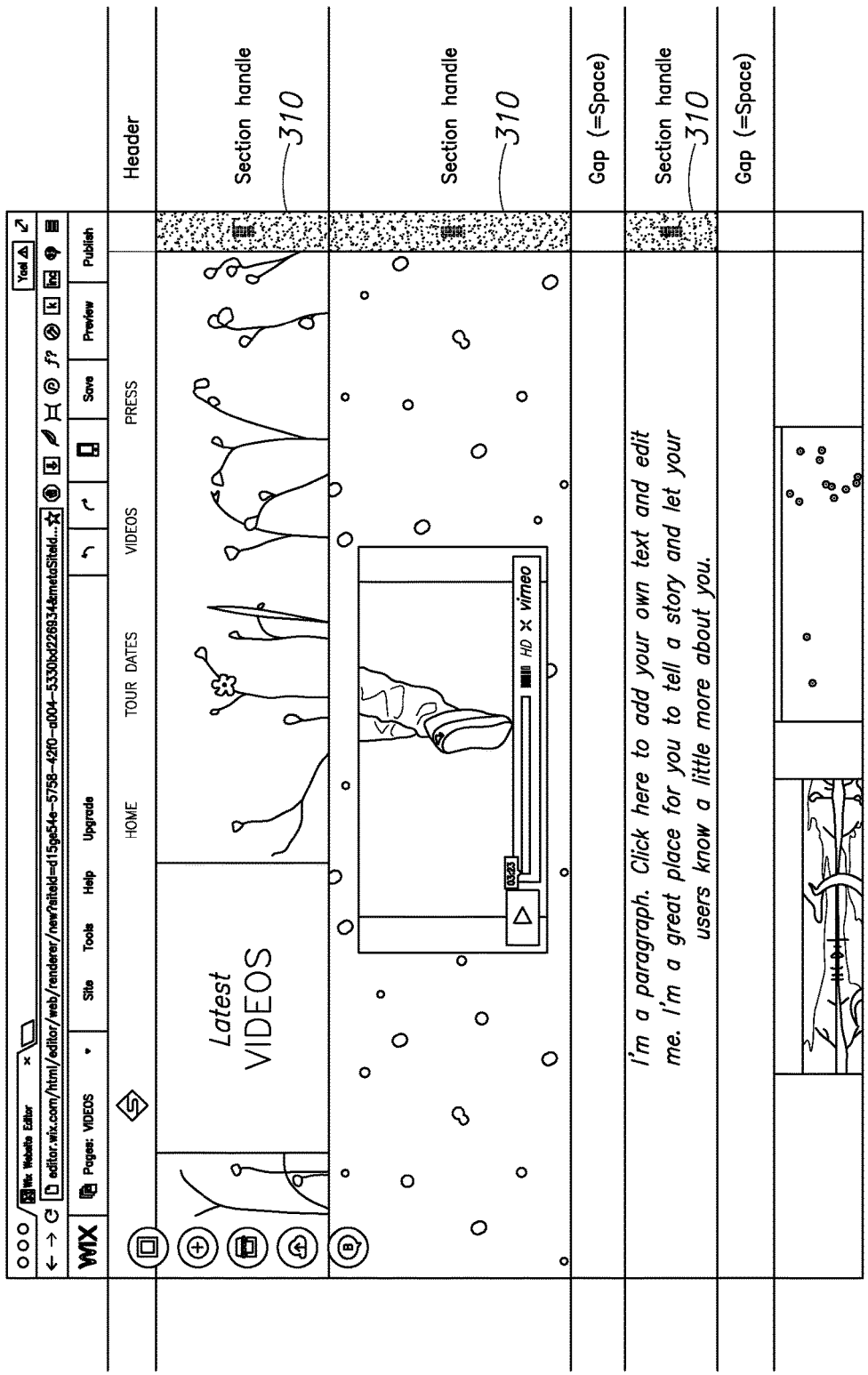
FIG. 19 is an illustration of a screenshot of a page analysis; constructed and operative in accordance with the present invention.

Reference is now made to FIG. 18 which illustrates an example page analysis using horizontal dividers that may be performed by element divider 172, including a header/footer (1), full width elements (2) and inter-element gaps (3). Reference is also made to FIG. 19 which shows an illustration of a screenshot of how an actual website may be analyzed (including the generated section handles 310 associated with the located sections as described in more detail herein below).

In an alternative embodiment, system 300 may allow some level of element-divider intersection, generating multiple possible divisions and grading these multiple divisions for quality, as detailed in the description of element divider 244 in U.S. Patent Publication No. 2015/0074516.

It will be appreciated that element divider 172, may also take into account additional information in order to locate sets of elements which should reside in the same section, as detailed in the description of POS locator 250 in U.S. Patent Publication 2015/0074516. Such an analysis may rely (for example) on any of the following: element geometrical relationships, element types and attributes, element semantic relationships (e.g. A is a caption text describing picture B and thus they should not be separated), element content (e.g. through a content analysis algorithm), element dynamic layout anchors, other element relationships and element editing history. This information may be extracted from database 130.

Thus, for example, element divider 172 may detect a picture/caption pair (identified through geometry, semantic or content analysis) which should remain in the same section and be moved together. Element divider 172 may also detect that a group of pictures forms a (virtual) picture gallery and should also be assigned to the same section.

It will be appreciated that system 300 may be implemented in a number of different embodiments which may handle section overlap differently. In one embodiment, sections may not overlap at all. In another embodiment, sections may overlap but only temporarily (e.g. while editing sections) and may snap to non-overlapping positions when user 5 finishes the section-related editing.

Reference is now made to FIG. 20 which illustrates such snapping. As is illustrated, page E has 4 strips A, B, C and D, situated one below the other as shown in configuration [1]. During editing strip B is extended so as to overlap C as shown in configuration [2] (this could also be due to position change rather than size change). In this case, once the editing is finished strip B may snap back to a size or position which is between A and C and without overlapping them (as shown in configuration [3A]). Alternatively, system 300 may affect the size or position of other sections, e.g. by "stretching" page E down and moving the sections following B (i.e. sections C and D) so as to make place for B's new size, as shown in configuration [3B]. System 300 may also combine the two options (snapping B but also affecting additional sections).

In yet another embodiment, system 300 may allow sections to overlap in general (i.e. in the same way regular components and containers may overlap). Such overlap may be part of a pre-defined arrangement (e.g. of a template provided by the system containing overlapping sections) or created by the user through page editing.

Figure 21A:
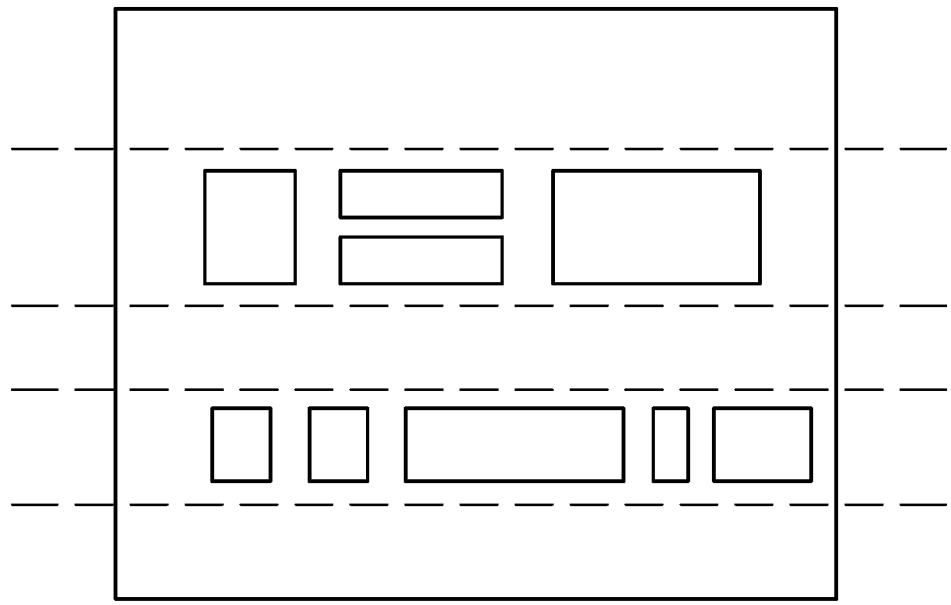
FIGS. 21A, 21B, 21C and 21D are schematic illustrations of inclusive vs. non-inclusive sections.
Figure 21B:
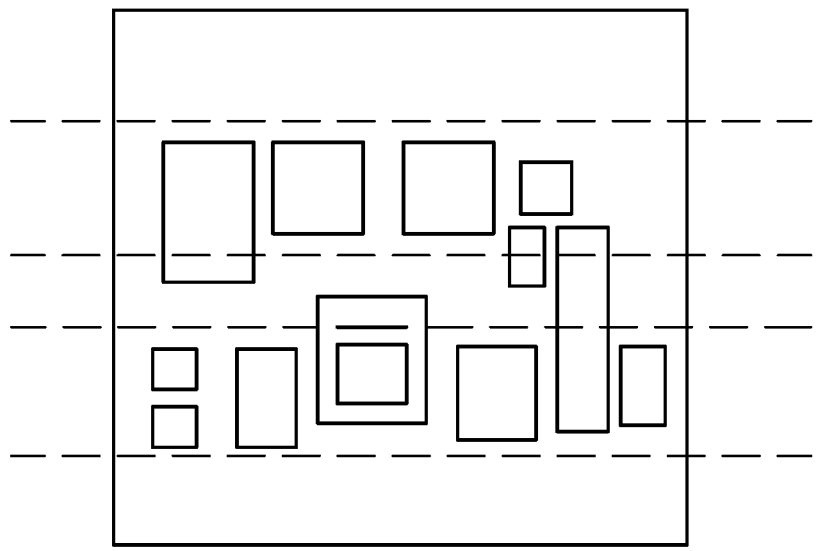

Furthermore, system 300 may require all sections to be inclusive or alternatively may allow some sections to be non-inclusive. Inclusive sections require all objects in the section to be fully contained in the section's (possibly virtual) container as is illustrated in FIG. 21A to which reference is now made. Non-inclusive sections may allow some components to protrude from the section container, even (to some extent) intersecting with other sections as is illustrated in FIG. 21B to which reference is now made. The amount of such allowed protrusion/intersection may depend (for example) on a geometrical analysis of the page by element divider 172 when determining how to build sections as further discussed herein below.

Figure 21C:
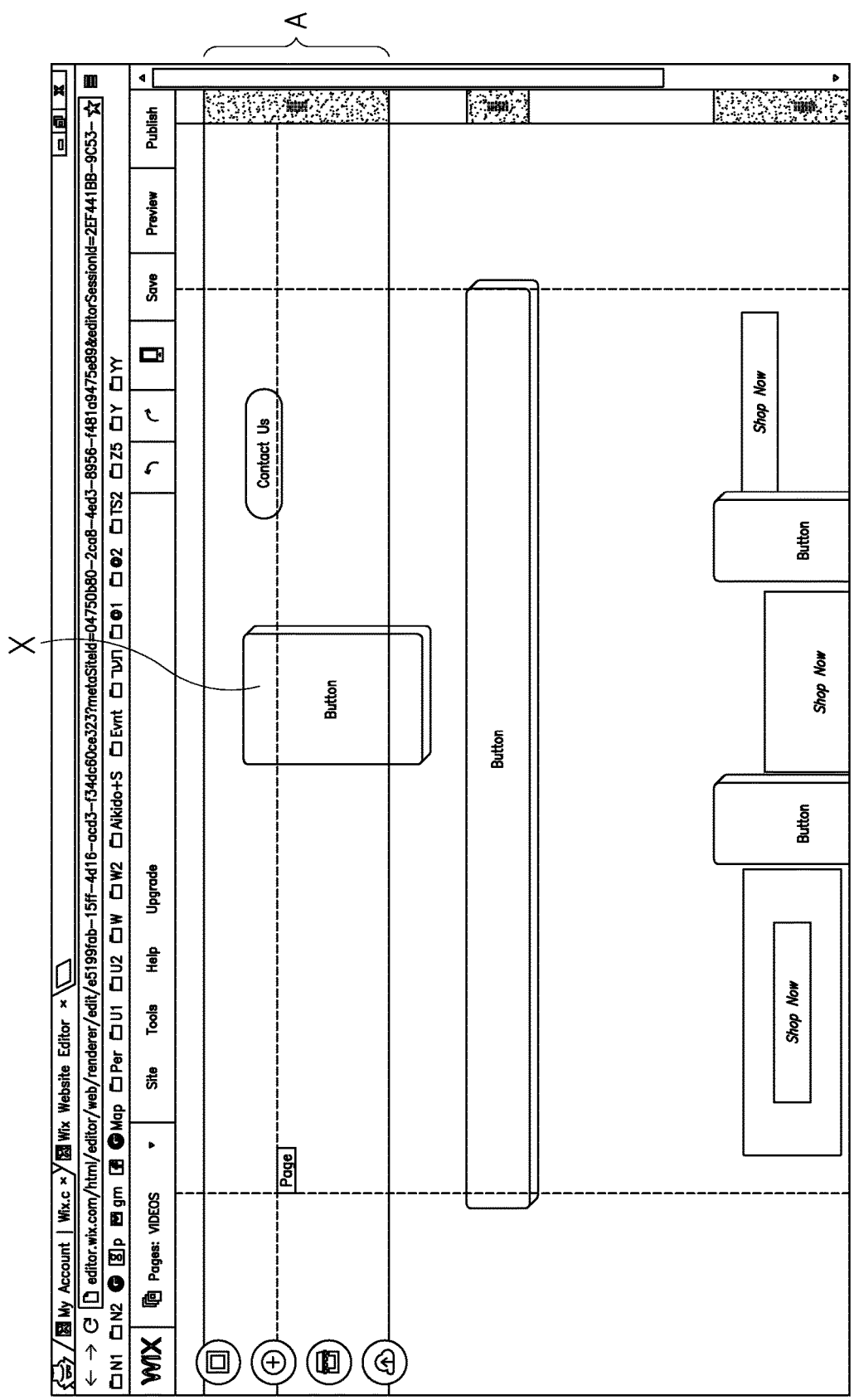
Figure 21D:
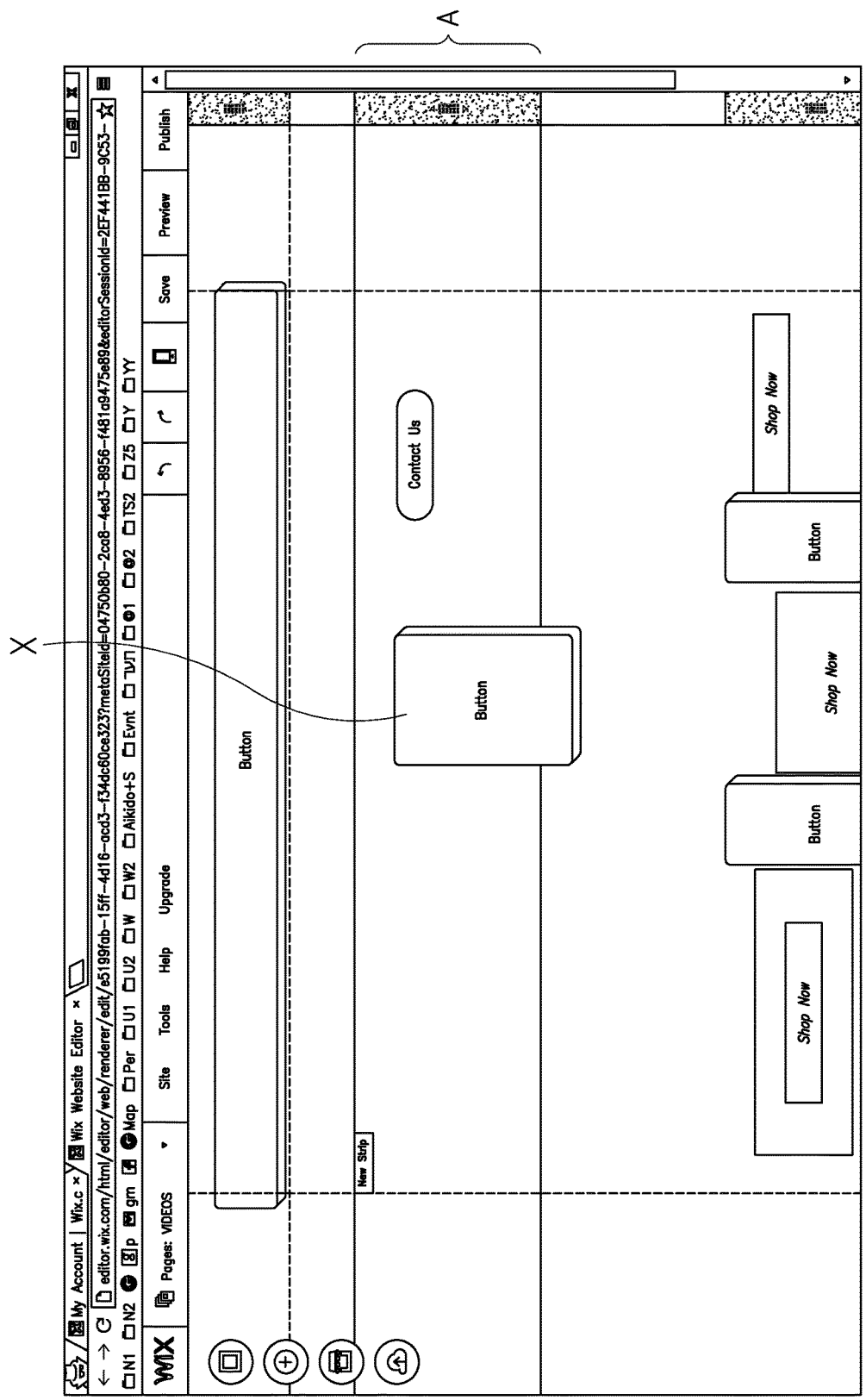

Reference is now made to FIGS. 21C and 21D which further illustrate a non-inclusive section, with a component X protruding (in a limited way) from section A. As is seen in FIG. 21D when A is moved, protruding component X moves with section A.

It will be appreciated (as discussed herein above), that each section definition may be regarded as a virtual container for the purpose of further editing and manipulation as described in more detail herein below.

Once the sections are defined, UI subsystem 160 may provide the necessary user interface to present the sections to user 5 and to aid user 5 perform section reordering, insertion, deletion and possibly additional section manipulations. This may be particularly difficult, as in the case of full-width strips the moved elements (strips) are large and it may be difficult for user 5 to manipulate them and retain the proper context during section manipulation.

It will be appreciated that UI subsystem 160 may employ different UI variants and methods to enable manipulation of the defined sections. It will also be appreciated that the presented manipulation tools may include a combination of more than one type of tool. For example, a manipulation window may present sections having different UI and handles (either on the sections themselves or on the manipulation scroll bar). Thus a zoomed window may be presented differently from the original window. It will also be appreciated that the manipulation window may in fact hide some of the actual sections when displayed.

Figure 22:
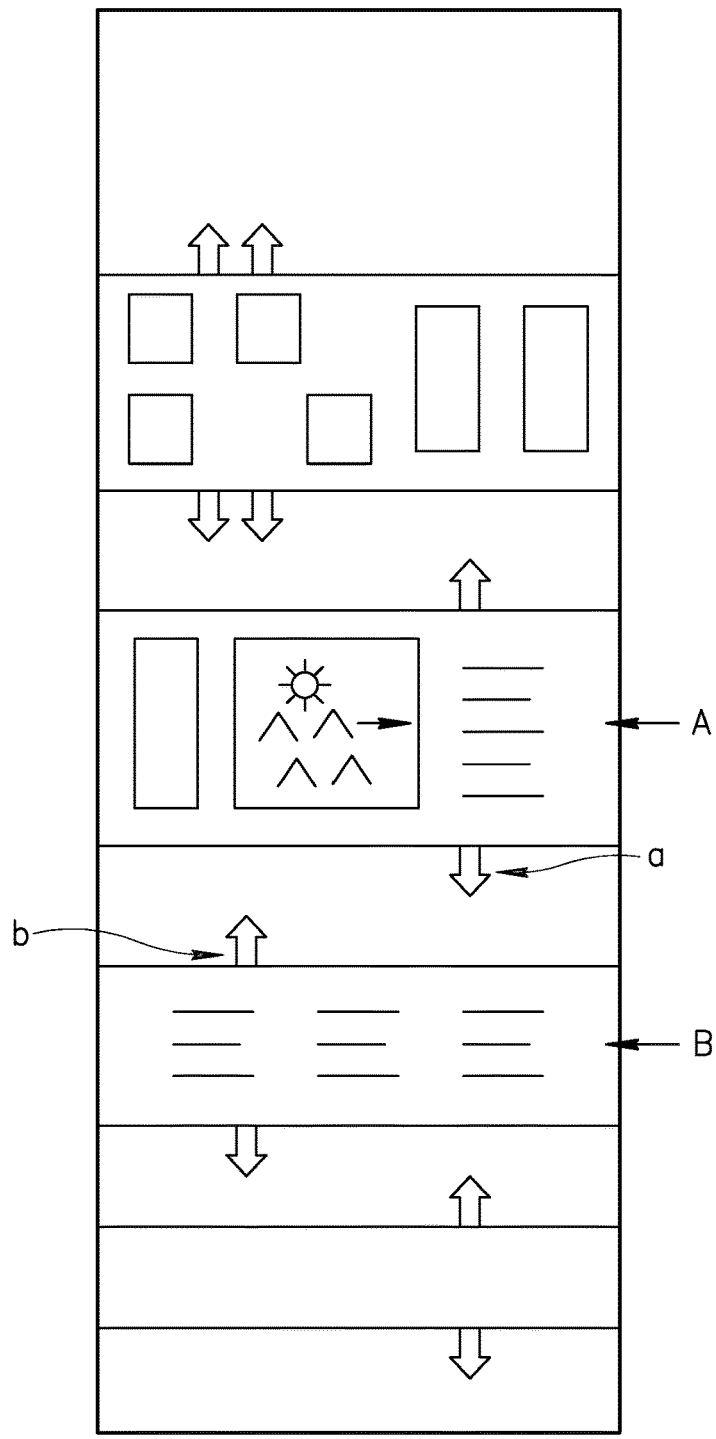
FIG. 22 is a schematic illustration of staggered handle placement on strips; constructed and operative in accordance with the present invention.

UI handle generator 162 may add a set of dynamic handles to the generated sections, such as a pair of "move section up" (b) and "move section down" (a) handles on the top and bottom of each section as illustrated in FIG. 22 to which reference is now made. Thus pressing on either handle [a] or handle [b] will cause sections [A] and [B] to exchange their positions.

UI handle generator 162 may automatically arrange or stagger such handles so that they do not interfere with each other (on adjacent sections). Such staggering may be performed by placing (for example) different strip handles in different horizontal positions, as illustrated in FIG. 22 (in which handle [a] of strip [A] and handle [b] of strip [B] are added in different horizontal positions). In an alternative embodiment other SE generator 166 may generate separate up/down arrows which may move a currently selected section (or sections) up or down as required in the section order (such as arrows [a] and [b] in FIG. 26 to which reference is now made).

Figure 23A:
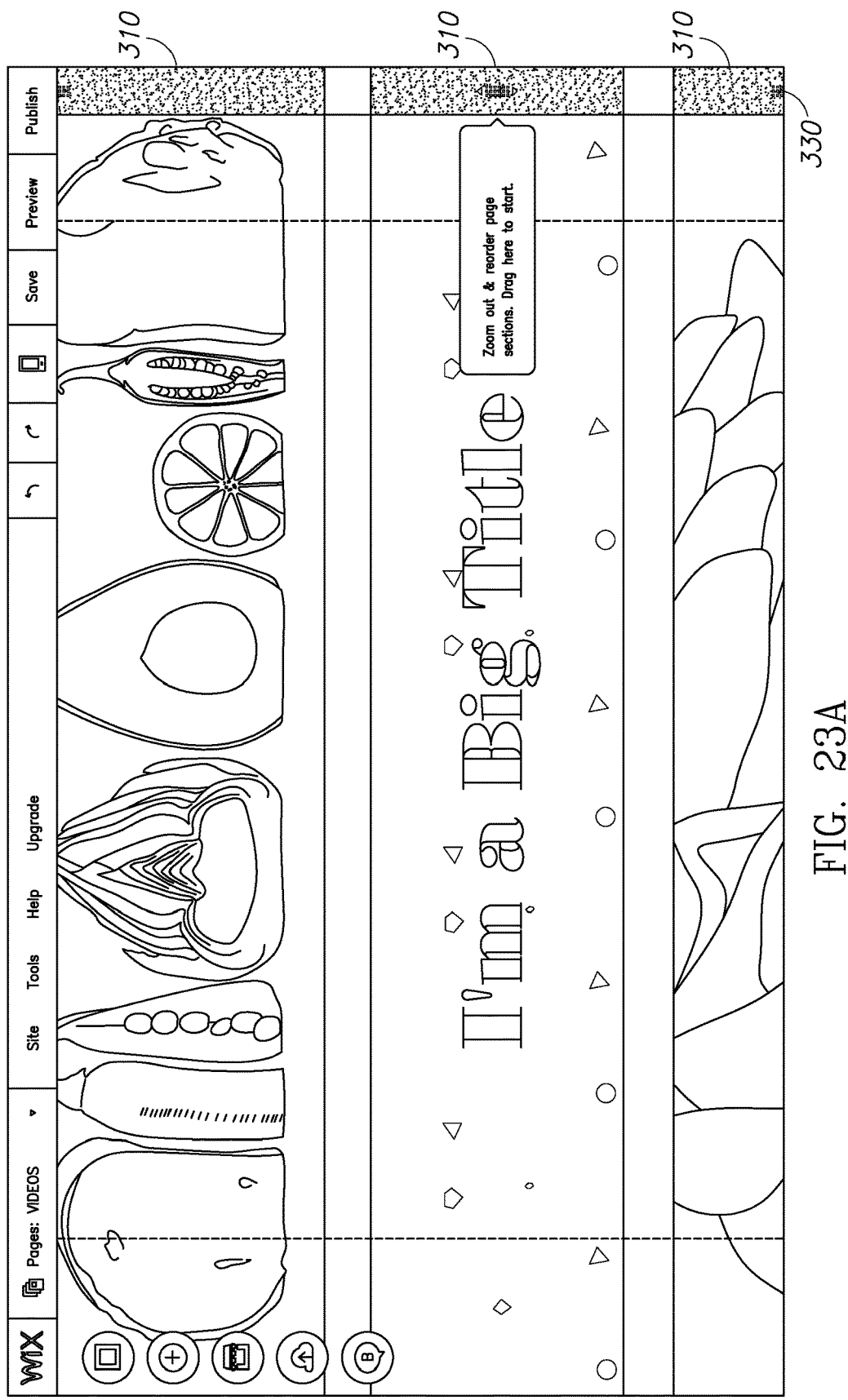
FIGS. 23A, 23B, 23C and 24 are illustrations of screen shots showing the use of added scroll-bar handles and section elevators for section manipulation; constructed and operative in accordance with the present invention.

It will be appreciated that visual design system pages typically have scroll bars (a long thin section at the edge of a computer display or window by which material can be scrolled using a mouse which moves a scroll bar elevator). UI handle generator 162 may also add a set of dynamic handles which do not reside on the sections themselves, but are attached or placed near other control structures. One typical embodiment may use additional (one or more) handles in the form of multiple scroll-bar elevators 310 which are associated with the sections (as is illustrated in FIG. 23A to which reference is now made). Handles 310 may all reside in the same scroll bar area 330.

Figure 23B:
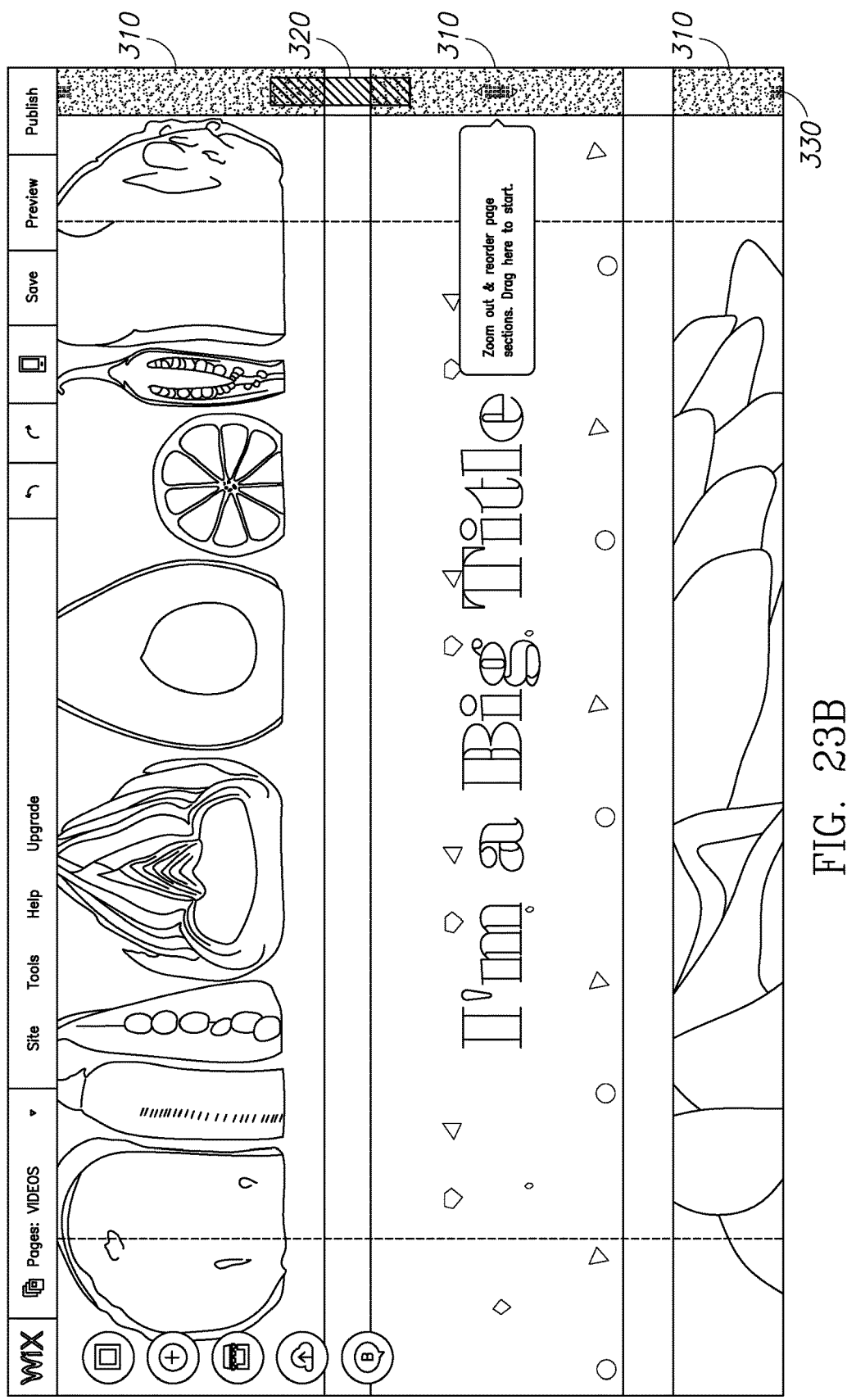
Figure 23C:
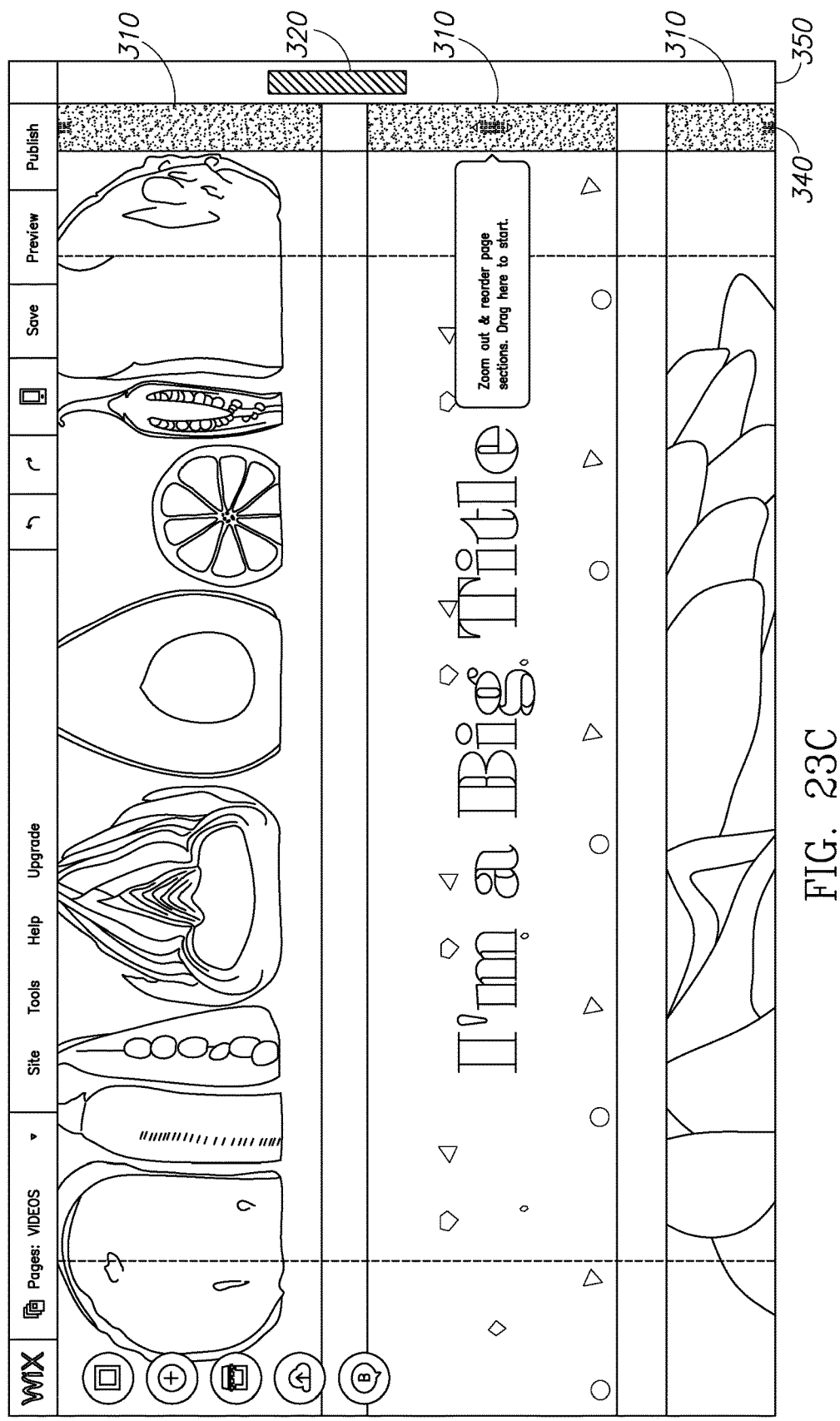
Figure 24:
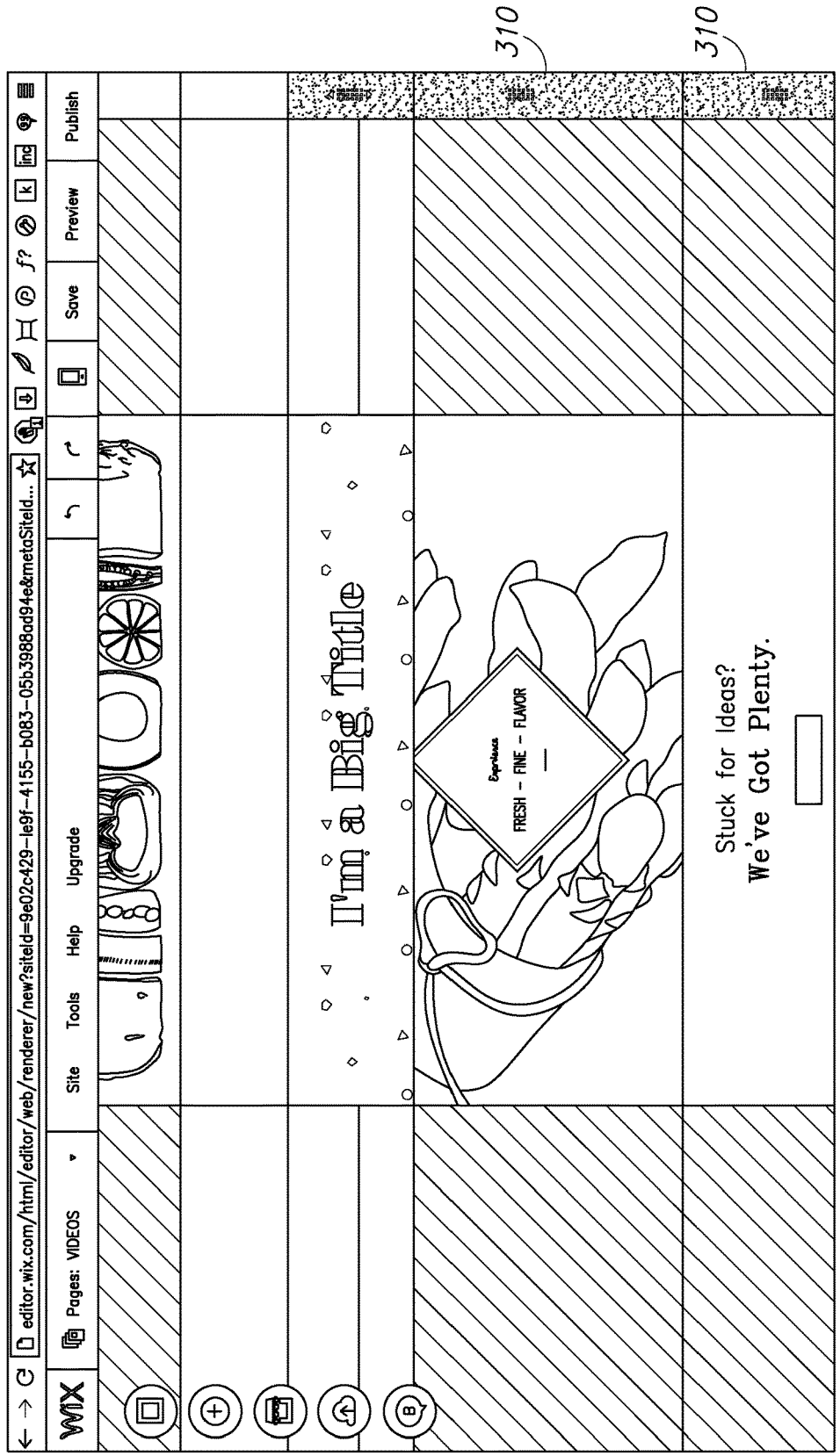

It will be appreciated that the page may be larger than the window available for its display, e.g. due to the page actual size or the user zooming into the page. In such a case, system 300 may need to display a regular scroll bar (e.g. to allow the user to vertically scroll over the page) as well as sections elevators. This may be resolved in a number of manners, e.g. by using a separate overlaying scroll bar elevator 320 to perform the scrolling in the same elevator area 330 (as illustrated in FIG. 23B to which reference is now made). Alternatively, system 300 may use two separate scroll bar areas (as illustrated in FIG. 23C to which reference is now made) a section area 340 for the section elevators 310, and a scroll-bar area 350 for the actual scroll-bar elevator 320.

Figure 25A:
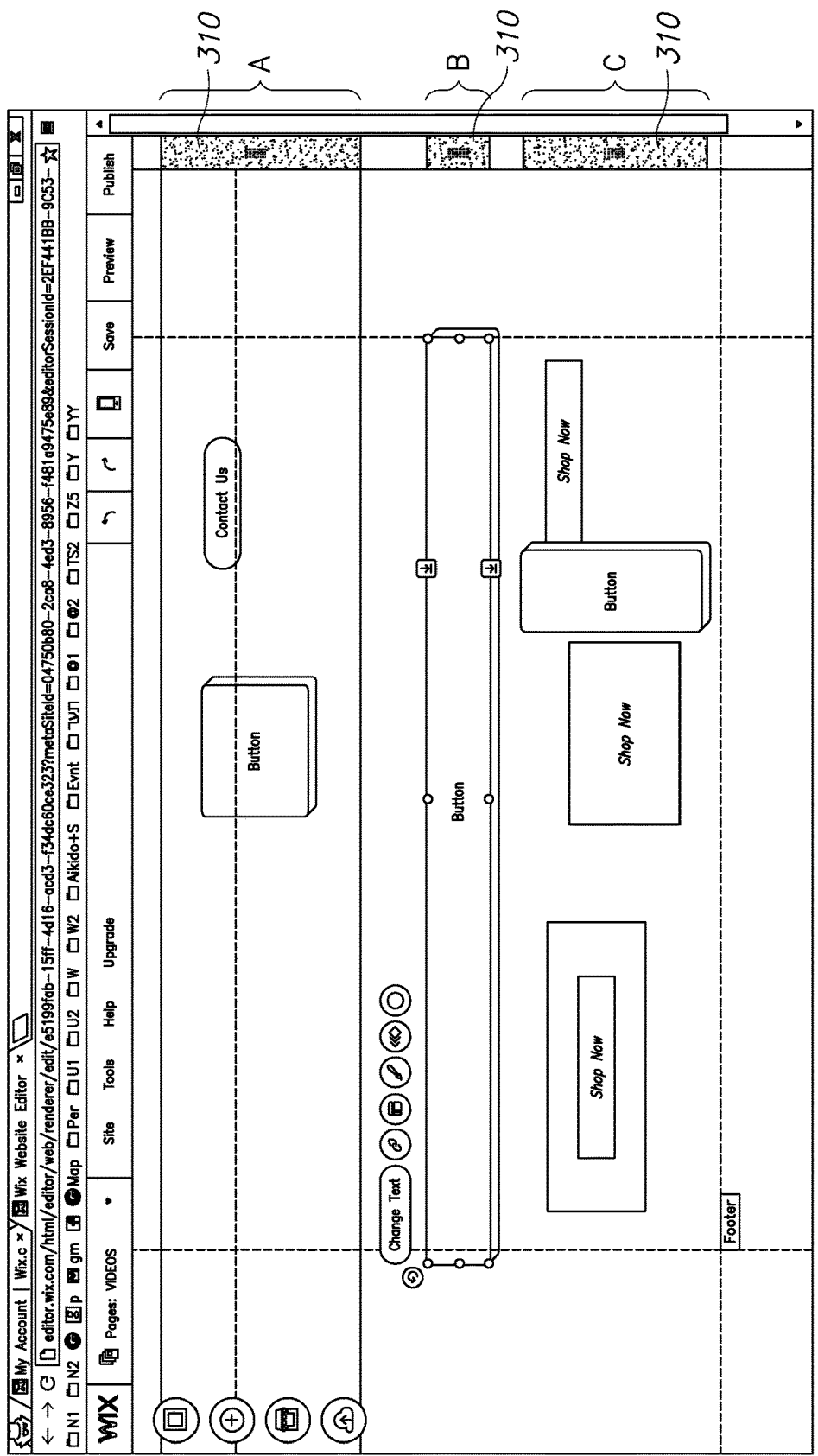
FIGS. 25A and 25B are schematic illustrations of overlapping sections.
Figure 25B:
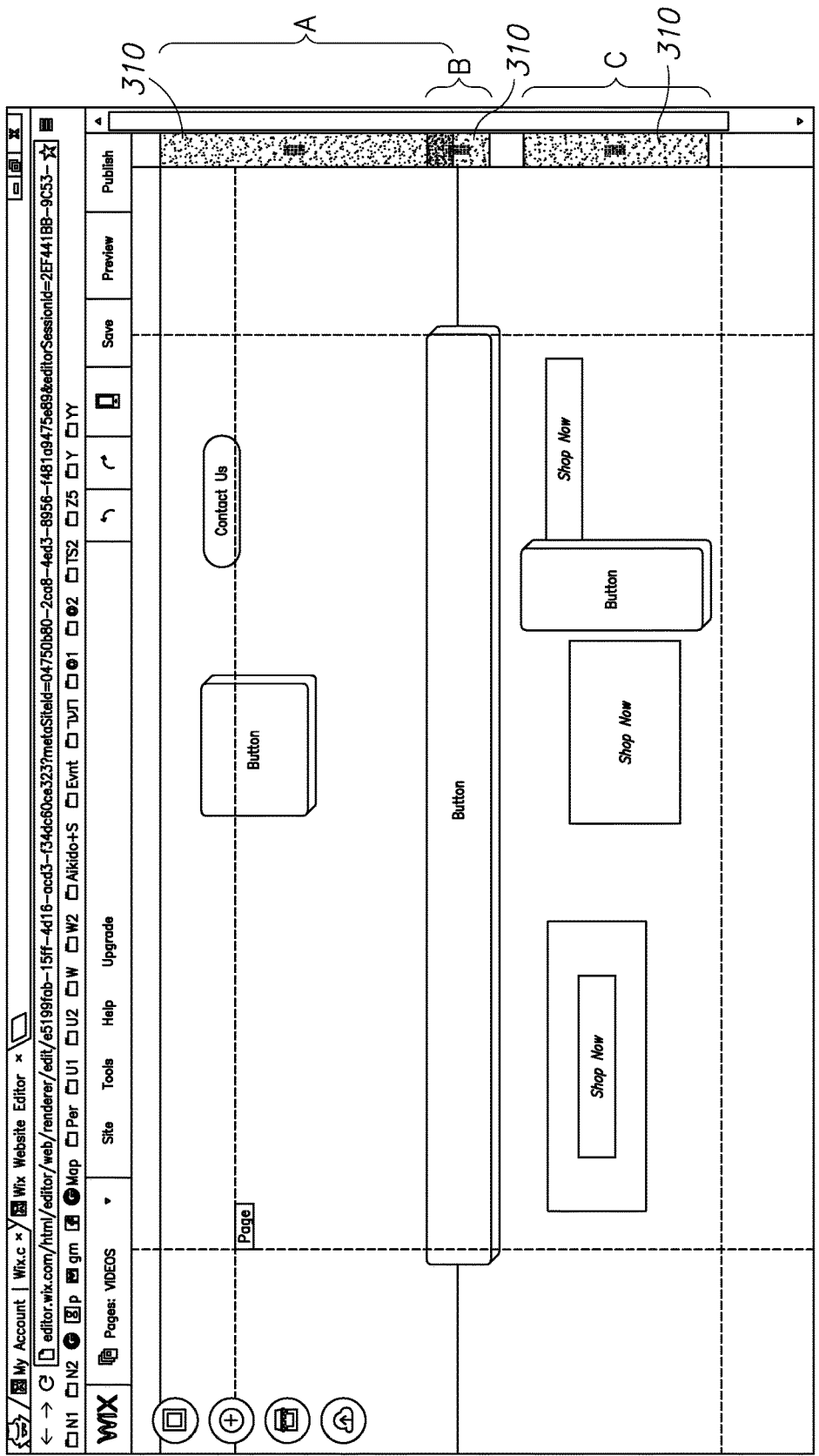

The handles 310 may overlap if the sections themselves overlap as described in more detail herein below. It will be appreciated that the handle 310 may follow the section when dragged as is illustrated in FIGS. 25A and 25B to which reference is now made. Handle 310 would also be resized if the section is resized, so to match the section top and bottom edges.

It will also be appreciated that (as discussed herein above) in some embodiments sections may overlap each other, either temporarily (e.g. while editing the sections) or as part of regular way sections are arranged. This may occur, for example, with a pre-defined template containing (overlapping) sections or due to section boundary, position or size editing. Reference is now made to FIGS. 25A and 25B which show an example section arrangement, with 3 separate strips (marked A, B and C). In FIG. 25B, Strip A has been extended so to overlap strip B and thus their handles 310 overlap as well.

Figure 26:
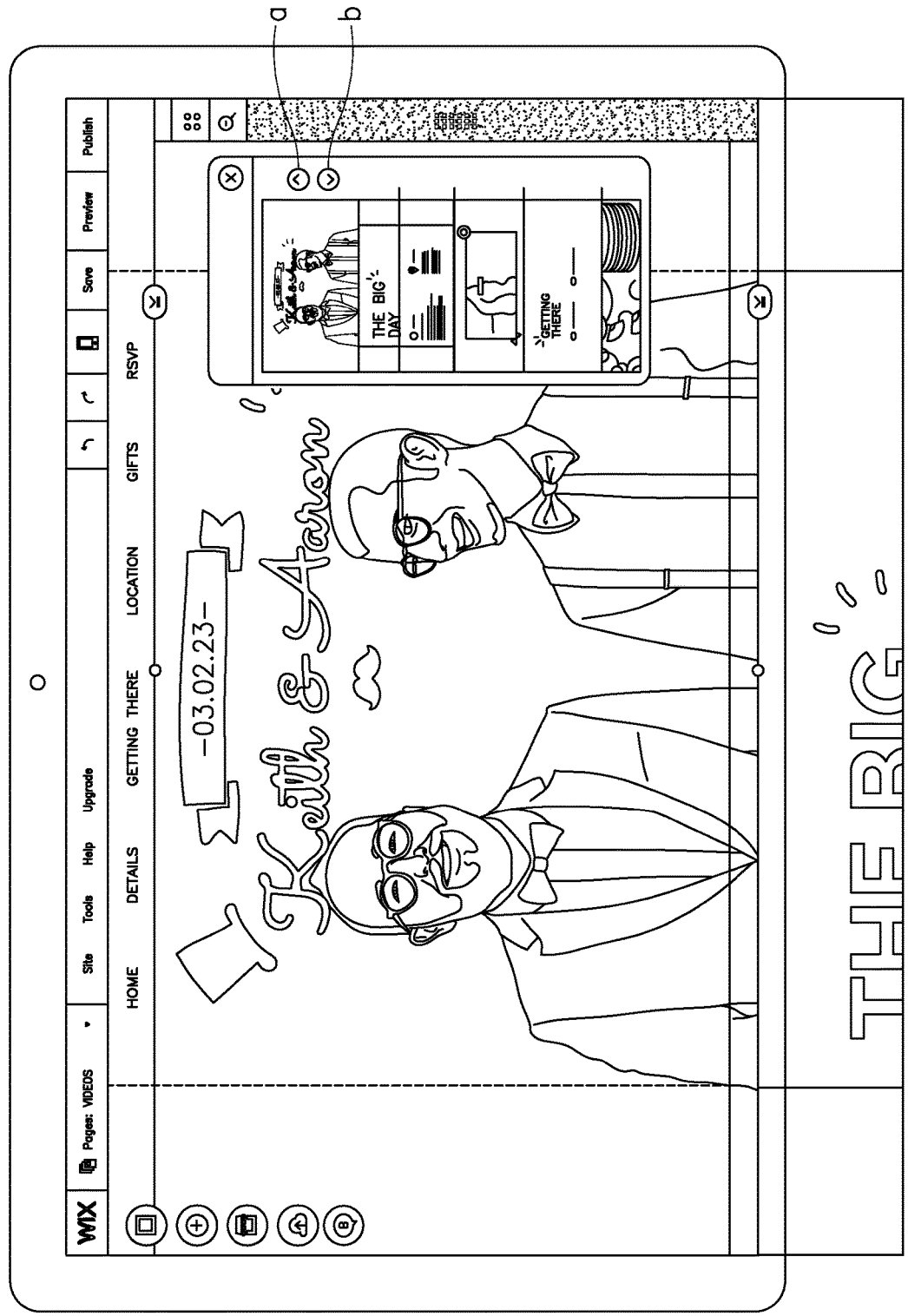
FIG. 26 is an illustration of a screenshot of a website page showing the use of a manipulation window to manipulate the generated sections; constructed and operative in accordance with the present invention.

It will be appreciated that UI runner 161 may display a manipulation window (a reorder panel) which shows a zoomed-in version of the full page as is illustrated in FIG. 26 to which reference is now made.

In the two handle-based example as described herein above, once user 5 grabs handle 310, UI subsystem 160 may provide a zoomed-out view of the site and user 5 may drag the section in the zoomed-out view, thus providing extended context to user 5. UI subsystem 160 may also provide explicit methods (such as UI controls) by which user 5 may manually invoke manipulation window manager 163 to display a zoomed-out view. Manipulation window manager 163 may calculate the zoom factor appropriately based on the section and page size and the amount of required context (which would make it easy for user 5 to edit the page). For example manipulation window manager 163 may allocate a zoomed view area which is 50% of the size (in each dimension) of the main page view. Manipulation window manager 163 may also vary the zoom factor and scrolling speed during dragging, depending (for example) on the amount of scrolling done, the current scroll speed employed by user 5, the size of sections "passed" during the scrolling etc.

When user 5 releases the mouse (in zoomed mode or not), Change executor 165 may locate the dragged section before or after another section (as appropriate), e.g. "snapping" it to the closest/most relevant inter-section position. UI subsystem 160 may also provide an alternate "drop in any place" mode (e.g. using shift-drag), in which the dragged section may be dropped in any place on the page, including positions overlapping other sections, or existing inter-section space area. System 300 may also support alternate user input means, such as using a keyboard, using a trackball, using touch-screen gestures, user motion recognition etc.

As discussed herein above, smart handles 310 can be pre-determined to activate or ignore dynamic layout anchors. Thus, they may not trigger regular dynamic layout actions, and may re-wire the anchors once the dragging is complete as described in U.S. Patent Publication 2013/0219263.

It will be appreciated that handles 310 may also be used for additional functions related to dynamic layout functionality, such as creating more space in the section (e.g. by pulling down the bottom part of the handle and "pushing" the sections below). These additional functions are typically affected by automatic creation and removal of dynamic layout anchors in conjunction with modifying the section virtual containers and regular containers and components.

Thus, a single UI element (e.g. scrolling elevator area 320) may contain in fact multiple logical active areas (multiple "virtual handles") with different functions.

It will also be appreciated that system 300 may omit the section manipulation UI in some cases, e.g. if a single section is defined/detected in the page, based on a user setting or automatically for novice users. In such a case, section manipulation would be limited.

As discussed herein above, once the sections have been presented accordingly to user 5 via UI runner 161, user 5 may manipulate the page as desired. It will be appreciated that actions may include deleting sections, adding or inserting sections, re-ordering sections, editing sections and redefining strips/sections. User 5 may also duplicate sections. User 5 may also be able to modify the space between sections, e.g. using specific handles 310 which increase or decrease the amount of space between two strips by moving the strips below the specific gap up and down (together). It will be further appreciated that these manipulations may be performed by user 5 with or without the use of smart handles 310 or by using scroll bar elevators 320. It will be appreciated that all of these operations may be performed inside the main WYSIWYG page view, or on a zoomed view created by manipulation window manager 163 accordingly.

Once user 5 has edited the page, change executor 165 may receive the required actions and regenerate the page accordingly. For example, if user 5 has removed a section, change executor 165 may modify the website page accordingly, taking into account any dynamic layout rules that have been pre-defined between the sections as described herein above. Such modifications may affect components (e.g. removing the components in a removed section), virtual containers (e.g. modifying virtual containers size due to section resizing) or other page elements.

It will be appreciated that change executor 165 may also reorder the sections of the page. It will be appreciated that page analyzer 170 may also identify empty sections and allow user 5 to delete them if desired. This may occur, for example, if user 5 has moved all the components from inside a section to other sections, leaving the sections framework (and virtual container) intact but without content. Change executor 165 may inform user 5, may provide an option to delete the section, and may further re-arrange the sections "around" the deleted section so as to provide aesthetic results (e.g. by re-dividing the space left by the deleted section between the other sections).

As discussed herein above, visual design systems can be often classified as absolute positioning or relative positioning systems. In absolute positioning systems the location of the components is defined as an absolute position value (x,y) relative to the containing entity, be it relative to the page itself or to a container containing the component. In relative positioning systems, the focus is on the concept of flow or natural order. The system arranges components along a logical content flow, which typically corresponds to the reading order of the components (if applicable). Visual design systems which use absolute positioning are best suited for exact layout and design of the displayed page.

In an absolute positioning system, some layout types may be defined as a logical sequence of entities. For example, a section-based page may be defined as sequence of sections (sorted according to their y value from the top of page down). When an order is not immediately apparent (e.g. an order should be defined for components distributed on the page), the system may determine such an order using mechanism such as basic orderer 247 described in U.S. Patent Publication 2015/0074516.

As an example, user 5 may want to move a given section to a new position in the section sequence, e.g. moving strip C in the sequence A-B-C-D-E-F-G to a new position between F and G, creating the new strip sequence A-B-D-E-F-C-G. The new position may also be before or after all other elements (e.g. moving C to the top so to form the sequence C-A-B-D-E-F-G).

Change executor 165 may apply a reorder operation to the sequence above. The reorder operation may be direct (moving C to its final position directly) or may be incremental, moving C through the positions in the middle, i.e. changing the layout through the following sequence of layouts:

A-B-C-D-E-F-G
A-B-D-C-E-F-G
A-B-D-E-C-F-G
A-B-D-E-F-C-G

Figure 27:
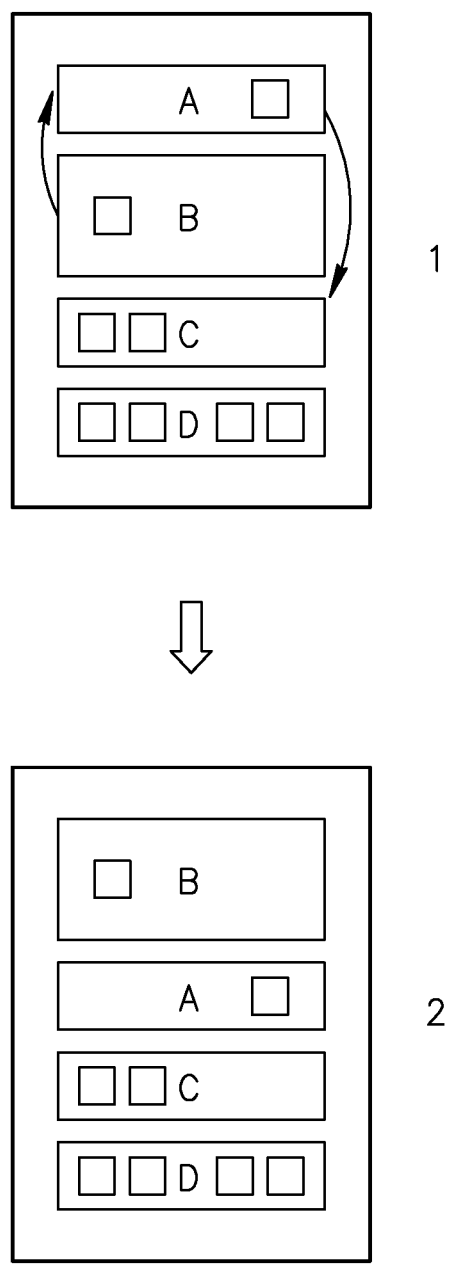
FIG. 27 is a schematic illustration of the use of re-ordering in the context of full-width web site strips; constructed and operative in accordance with the present invention.
Figure 28:
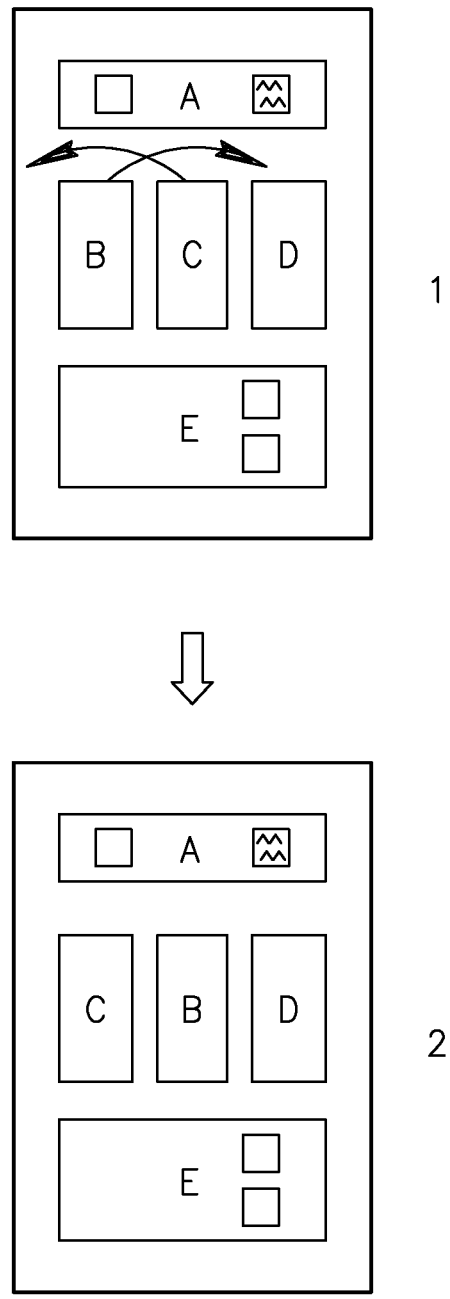
FIG. 28 is a schematic illustration of the use of re-ordering in the context of specific page areas; constructed and operative in accordance with the present invention.

Reference is now made to FIGS. 27 and 28 which illustrate different types of reordering procedures. Change executor 165 may apply the re-order operation (for example) to strips (as illustrated in FIG. 27), to columns inside a strip (as illustrated in FIG. 28), to menu or list entries (horizontal or vertical), or to any other elements configuration.

It will be appreciated that change executor 165 may also easily apply the re-order operation in relative positioning systems which are based on an ordered sequence of elements.

Figure 29A:
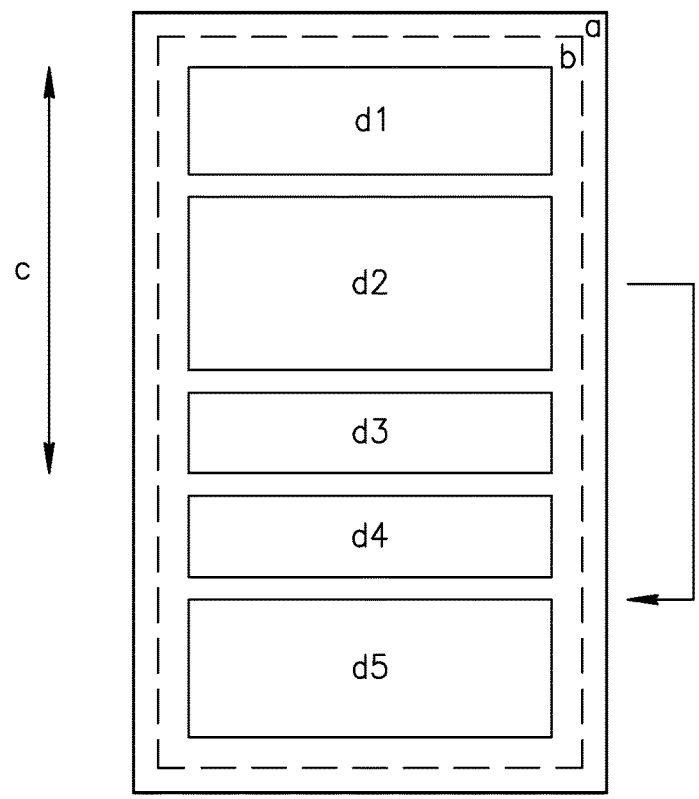
FIG. 29A is a schematic illustration of a 1-dimensional reorder operation; constructed and operative in accordance with the present invention.
Figure 29B:
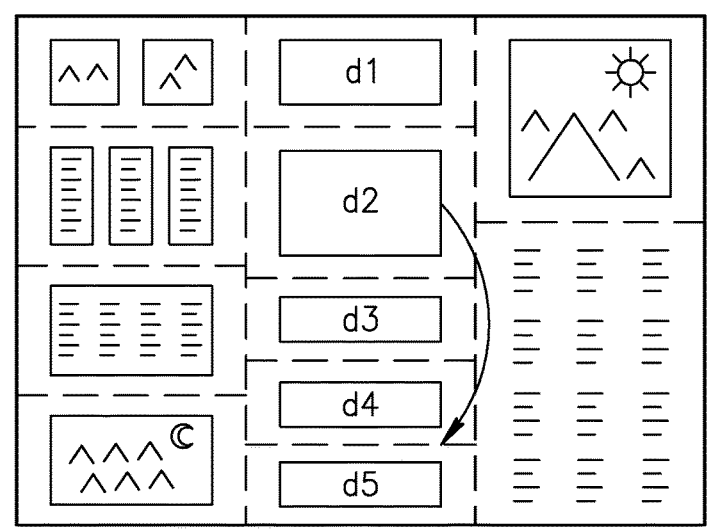
FIG. 29B is a schematic illustration of a 1-dimensional reorder operation inside a 2-dimensional division; constructed and operative in accordance with the present invention.

Reference is now made to FIG. 29A which illustrates a 1-dimensional reorder operation. In order for the operation to be applied in an absolute positioning system, change executor 165 may determine the area in which the reorder is to be applied i.e. the reorder area [b] in FIG. 29A. It will be appreciated that area [b] could be the entire page [a] (in the case of strip reordering), or may just be a part of the page (e.g. when applying re-ordering to sections inside a single column in a 2-dimensional multi-column arrangement as shown in FIG. 29B in which re-ordering is only applied to the middle column).

Change executor 165 may then determine the reorder direction [c] and may then determine the division of the reorder area into reordered sections [d1] to [d5] along the reorder direction. It will be appreciated that the reordered sections may have different dimensions, along the reorder direction [c] or along the axis.

Change executor 165 may then determine the primary moved section i.e. the section which is moved to an alternate position (e.g. [d2] is moved to the position between [d4] and [d5]).

Change executor 165 may then change the coordinates of the primary moved section (e.g. [d2]) as well as the sections which are moved so to create a place for the primary moved section (e.g. [d3], [d4]).

It will be appreciated that change executor 165 is only required to change the coordinates matching the reorder direction (i.e. the y-coordinate in this case). Furthermore, the reordered sections may keep their original size (in both axes) and aspect ratio.

It will also be appreciated that when moving the sections, change executor 165 may break and reconstruct some of the pre-change dynamic layout anchors. For example, the vertical structure shown in FIG. 29A may include dynamic layout anchors from each of the sections to the sections above and below it. Therefore, when moving [d2], change executor 165 may be required to do some or all of the following (depending on the anchor parameters in particular):

Break [d2] anchors with its existing neighbors [d1] and [d3]

Break the anchors "crossing" [d2]'s new position between [d4] and [d5].

Create new anchors between [d2] its new neighbors [d4] and [d5].

Create new anchors in the [d2]'s "vacated" position i.e. between [d1] and [d3].

Figure 29C:
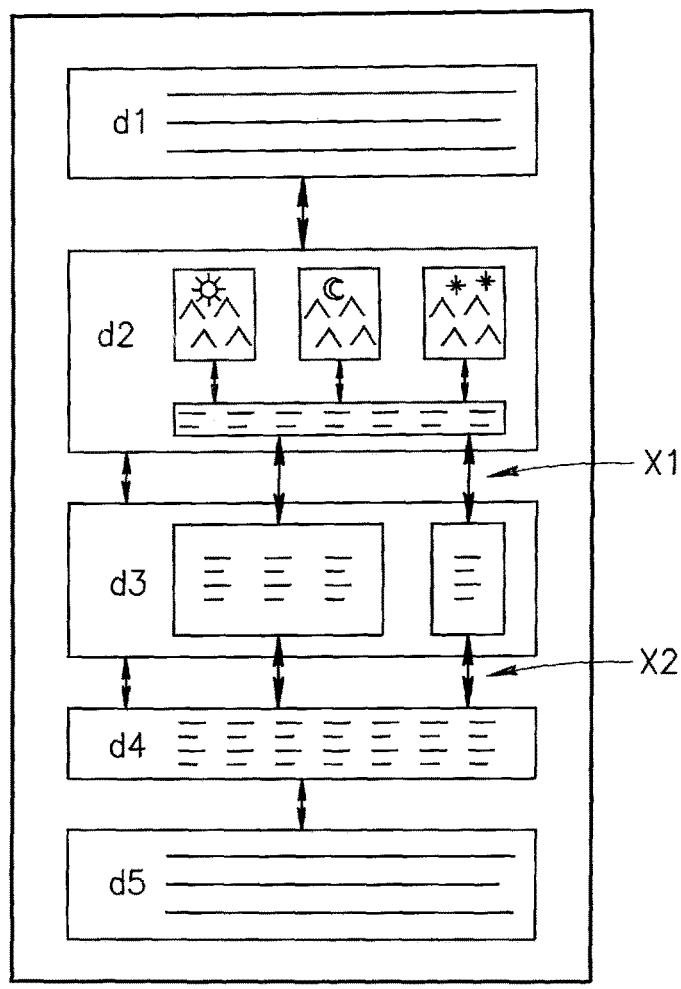
FIG. 29C is a schematic illustration of a set of anchors connecting sections and components; constructed and operative in accordance with the present invention.

As illustrated in FIG. 29C, some of the anchors may be between the sections (e.g. the dl-d2 and d4-d5 anchors), between internal components in two sections (e.g. the anchor marked [X1]) or between internal components in one section and another section (e.g. the anchor marked [X2]).

Some anchor types may remain even after reordering, e.g. explicit anchors connecting related internal sub-structures of different sections (as further described in U.S. Patent Publication No. 2103/0219263).

Figure 30A:
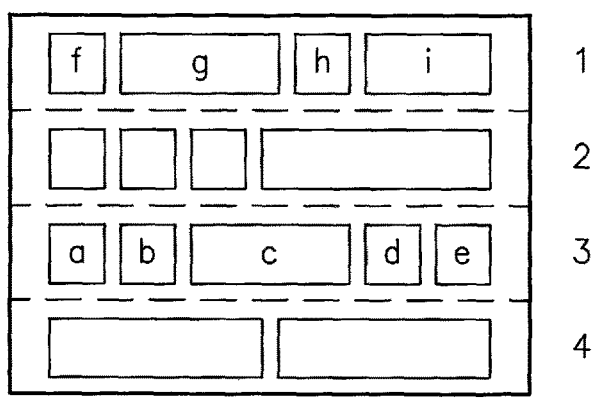
FIGS. 30A, 30B and 30C are schematic illustrations of a 2-dimensional division of a page; constructed and operative in accordance with the present invention.
Figure 30B:
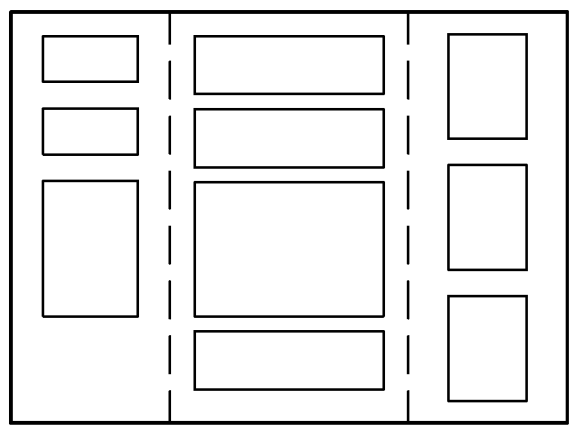
Figure 30C:
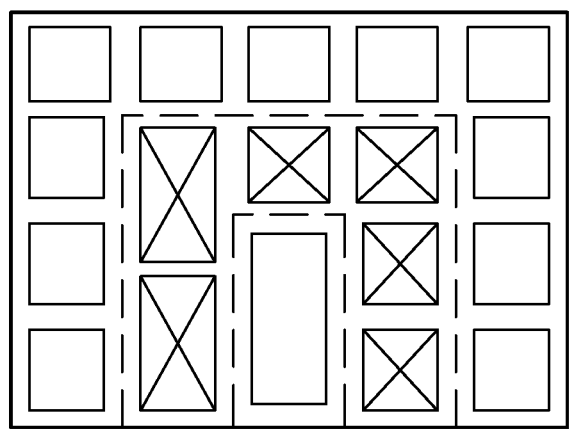

In another embodiment of the present invention, change executor 165 may apply reordering to a 2-dimensional division of the page. Reference is now made to FIGS. 30A, 30B and 30C which illustrate possible 2-dimensional divisions of a page. Such a division may be:

Horizontal-first-vertical-second division (i.e. divide into "lines" and then "line elements") as is illustrated in FIG. 30A.

Figure 31:
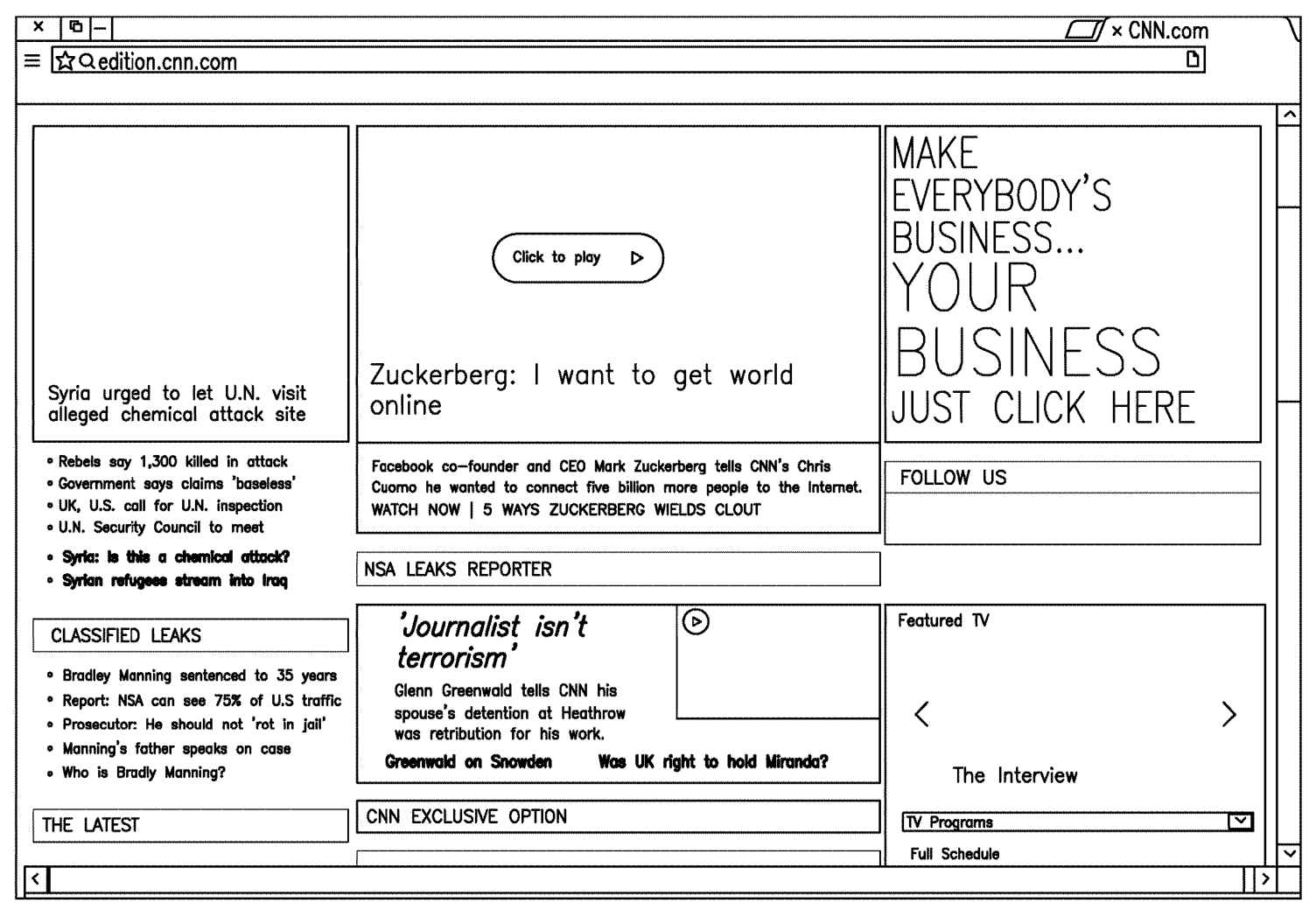

Vertical-first-horizontal-second division (i.e. divide into "columns" and then "column elements") as is illustrated in FIG. 30B. Such a division may be particularly useful for use with columnar "chocolate table" style web pages classical in newspaper layouts such as the example page illustrated in FIG. 31 to which reference is now made. The use of re-ordering of part of the page in such a division is illustrated in FIG. 29B.

It should be noted that (as illustrated in FIG. 30C), system 300 may use or automatically define sections which are not rectangular. Thus, sections may take multiple shapes, including shapes which combine with each other to form a complete page (e.g. similar to jigsaw elements).

Change executor 165 may also apply a different division, based (for example) on the page structure or elements. Reference is now made to FIG. 30C which shows a page divided into gate-like strips.

Using the example from FIG. 30A, system 300 may allow user 5 to take an element from one line (element [b] from line 3) and insert it between the elements of another line (elements [g] and [h] from line 1 for example).

In this scenario, change executor 165 may create a space for element [b] in line 1—possibly using element moving or resizing. Change executor 165 may also "fill in" the space left in line 3 (which can also be done by moving or resizing the remaining elements), or may alternatively leave the "hole" in the origin line, allowing the user to specify a new layout for this line manually.

Change executor 165 may also support moving of element from a line so as to form a new line, or moving of the last element from an existing line into another line (causing the now empty line to be deleted).

Figure 32:
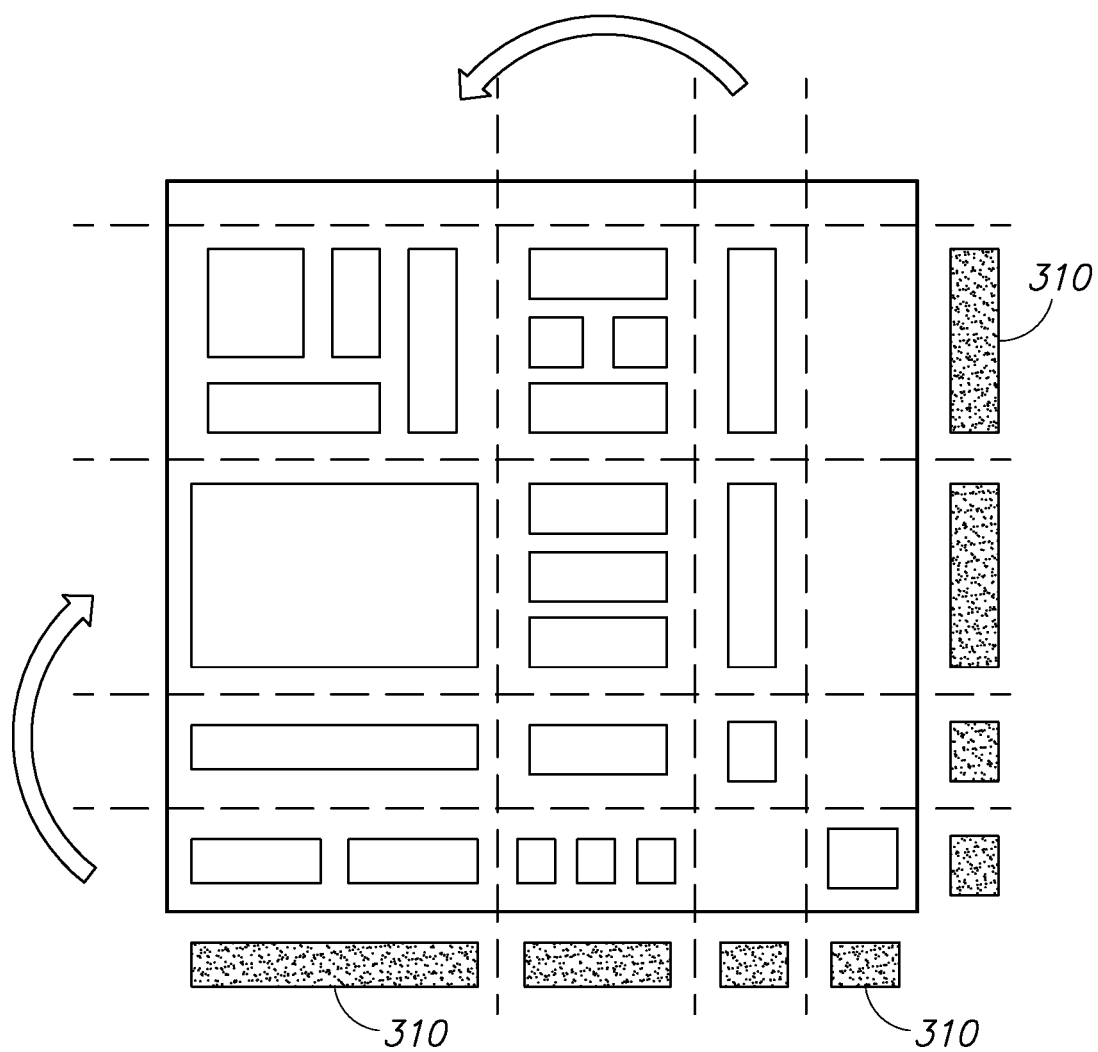
FIG. 32 is a schematic illustration of a dual-axis 2-dimensional reorder operation; constructed and operative in accordance with the present invention.

Furthermore, system 300 may support a dual-axis 2-dimensional operation, in which the page is divided into sections or strips in both directions, and reordering of sections can be done independently in both x-axis and y-axis, as further illustrated in FIG. 32 to which reference is now made. As is illustrated in FIG. 32, each axis may require its own set of handles 310.

Change executor 165 may also be required to break, modify and create dynamic layout anchors to support the element position and size changes resulting from the reordering.

It will be appreciated that the above discussion has focused on the analysis, editing and regeneration of complete pages. In an alternative embodiment, system 300 may also handle sub-regions of the page, performing analysis, editing and/or regeneration of these sub-regions only. This could be (for example) for the sake of optimization, or based on an explicit user 5 request.

Thus system 300 may convert a website page into sections and allow a user to manipulate the sections accordingly using smart handles (or other UI mechanisms and manipulation tools as described above) which may activate, disable or modify dynamic layout rules between the sections. It may also reorder the sections after such a manipulation accordingly and present the newly generated website page to the user.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety othese systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A visual design system comprising:
a dynamic layout editor to edit content according to dynamic layout rules during an editing session of a visual creation comprising at least one page having at least two components, wherein said dynamic layout rules are at least associated with at least one of: anchors and constraints for positioning said at least two components, and each component of said at least two components has geometrical properties indicating at least an absolute position value in said page;
a page analyzer to perform at least a geometrical analysis on said page at least in response to addition, removal, or modification of at least one of said at least two components during said editing session, said geometrical analysis comprising obtaining said geometrical properties of said at least two components, and to divide said at least one page into at least two sections based on at least geometrical relationships between said geometrical properties as determined according to said geometric analysis, wherein each of said at least two sections contains at least one component of said at least two components;
a UI subsystem to generate and present to a user, during said editing session, at least one section from among said at least two sections as a virtual container containing at least one of said two components, and to generate and attach at least one section manipulator tool to said at least one section to enable said user to perform manipulation on said at least one section, wherein said virtual container is a temporary container for use during said editing session;
a change executor to regenerate and display said at least one page with said section, during said editing session, based on said manipulation; and
a memory and a processor to activate said dynamic layout editor, said page analyzer, said UI subsystem and said change executor.

2. The system according to claim 1 and wherein said manipulator tool is at least one dynamic handle.

3. The system according to claim 2 wherein said at least one dynamic handle is a section elevator.

4. The system according to claim 3 and wherein said UI subsystem comprises a UI handle generator to add at least one of: at least one said dynamic handle to said at least one section and at least one said elevator to at least one scroll bar of said at least one page.

5. The system according to claim 3 and also comprising UI runner to present said at least one section to said user with at least one of: said at least one dynamic handle and said at least one said elevator on said at least one scroll bar of said at least one page.

6. The system according to claim 1 and wherein said manipulator tool is a manipulation window.

7. The system according to claim 6 and wherein said UI subsystem further comprises a manipulation window manager to perform zooming and zoom-related calculations and to create said manipulation window.

8. The system according to claim 7 further comprising said manipulation window manager to perform zooming based on at least one of: said section and page size and the amount of required content.

9. The system according to claim 6 and also comprising UI runner to present said at least one section to said user with said manipulation window.

10. The system according to claim 1 and wherein said page analyzer also performs analysis based on at least one of semantic analysis, editing history, content and attributes of said at least two components.

11. The system according to claim 1 and wherein said edit is at least one of removing, modifying, adding, re-ordering, moving, updating and inserting said at least one section.

12. The system according to claim 1 and wherein said dynamic layout rules are at least one of: between said section and at least one other section, between said section and at least one other component of said at least one page and between said at least two components of said at least one page.

13. The system according to claim 1 and wherein said visual design system is at least one of: a website building system, a desk top application development environment, a mobile application development environment, a client server application development environment, a non-browser web application development environment, a plug-in development environment and a shop-builder.

14. A method for a visual design system comprising:
editing content according to dynamic layout rules during an editing session of a visual creation comprising at least one page having at least two components, wherein said dynamic layout rules are at least associated with at least one of: anchors and constraints for positioning said at least two components, and each component of said at least two components has geometric properties indicating at least an absolute position value in said page;
performing at least a geometrical analysis on said page at least in response to addition, removal, or modification of at least one of said at least two components during said editing session, said geometrical analysis comprising obtaining said geometrical properties of said at least two components, and dividing said at least one page into at least two sections based on at least geometrical relationships between said geometrical properties as determined according to said geometric analysis, wherein each of said at least two sections contains at least one component of said at least two components;
generating and presenting to a user, during said editing session, at least one section from among said at least two sections as a virtual container containing at least one of said two components, and generating and attaching at least one section manipulator tool to said at least one section to enable said user to perform manipulation on said at least one section, wherein said virtual container is a temporary container for use during said editing session; and
regenerating and displaying said at least one page based on said manipulation.

15. The method according to claim 14 and wherein said manipulator tool is at least one dynamic handle.

16. The method according to claim 15 wherein said at least one dynamic handle is a section elevator.

17. The method according to claim 16 and wherein said generating at least one section manipulator tool comprises adding at least one of: at least one said dynamic handle to said at least one section and at least one said elevator to at least one scroll bar of said at least one page.

18. The method according to claim 16 and also comprising presenting said at least one section to said user with at least one of: said at least one dynamic handle and said at least one said elevator on said at least one scroll bar of said at least one page.

19. The method according to claim 14 and wherein said manipulator tool is a manipulation window.

20. The method according to claim 19 and wherein said generating at least one section manipulator tool comprises performing zooming and zoom-related calculations and creating said manipulation window.

21. The method according to claim 20 and wherein said zooming is based on at least one of: said section and page size and the amount of required content.

22. The method according to claim 19 and also comprising presenting said at least one section to said user with said manipulation window.

23. The method according to claim 14 and wherein said performing is also based on at least one of semantic analysis, editing history, content and attributes of said at least two components.

24. The method according to claim 14 and wherein said edit is at least one of removing, modifying, adding, re-ordering, moving, updating and inserting said at least one section.

25. The method according to claim 14 and wherein said dynamic layout rules are at least one of: between said section and at least one other section, between said section and at least one other component of said at least one page and between said at least two components of said at least one page.

26. The method according to claim 14 and wherein said visual design system is at least one of: a website building system, a desk top application development environment, a mobile application development environment, a client server application development environment, a non-browser web application development environment, a plug-in development environment and a shop-builder.

* * * * *